US009544708B2

(12) United States Patent
Ham et al.

(10) Patent No.: US 9,544,708 B2
(45) Date of Patent: Jan. 10, 2017

(54) MOBILE TERMINAL AND CONTROLLING METHOD THEREOF

(71) Applicant: LG ELECTRONICS INC., Seoul (KR)

(72) Inventors: Jihye Ham, Seoul (KR); Jeongyun Heo, Seoul (KR); Daejin Kong, Seoul (KR); Jiyeon Kim, Seoul (KR); Sohoon Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 391 days.

(21) Appl. No.: 14/026,821

(22) Filed: Sep. 13, 2013

(65) Prior Publication Data

US 2014/0073299 A1    Mar. 13, 2014

(30) Foreign Application Priority Data

Sep. 13, 2012 (KR) ........................ 10-2012-0101597

(51) Int. Cl.
*G04B 23/02* (2006.01)
*H04W 4/00* (2009.01)
*H04W 4/02* (2009.01)

(52) U.S. Cl.
CPC ............. *H04W 4/001* (2013.01); *H04W 4/023* (2013.01); *G04B 23/02* (2013.01)

(58) Field of Classification Search
CPC ....... H04W 4/001; H04W 4/023; G04B 23/02; G04B 23/12
USPC ........................................................ 368/244
See application file for complete search history.

(56) References Cited

U.S. PATENT DOCUMENTS

| | | | | |
|---|---|---|---|---|
| 6,477,117 B1* | 11/2002 | Narayanaswami | .. | G04G 13/026 368/224 |
| 6,556,222 B1* | 4/2003 | Narayanaswami | .. | G04G 9/0064 368/295 |
| 7,504,930 B2* | 3/2009 | Beyda | .................... | G08C 17/02 340/309.16 |
| 8,036,068 B1* | 10/2011 | Yamagami | ............. | G04G 13/02 368/244 |
| 2006/0215495 A1* | 9/2006 | Soled | .................... | A61J 7/0481 368/10 |
| 2007/0217290 A1* | 9/2007 | Rock | .................. | H05B 37/0281 368/12 |
| 2011/0004651 A1* | 1/2011 | Tuli | ....................... | G04G 21/08 709/203 |
| 2011/0242945 A1* | 10/2011 | Iglesias | .................. | G04G 13/02 368/12 |
| 2012/0120773 A1* | 5/2012 | O'Toole | ................. | G04G 13/02 368/73 |
| 2014/0019352 A1* | 1/2014 | Shrivastava | ....... | G06Q 20/3674 705/41 |
| 2014/0337175 A1* | 11/2014 | Katzin | ................ | G06Q 20/204 705/26.62 |

* cited by examiner

*Primary Examiner* — Sean Kayes
(74) *Attorney, Agent, or Firm* — Lee, Hong, Degerman, Kang & Waimey

(57) ABSTRACT

A mobile terminal and controlling method thereof are disclosed, by which a linked application can be activated if an output of an alarm is ended. The present invention includes a display unit, a memory configured to store a set alarm time, and a controller configured to control an alarm to be outputted if a current hour becomes the set alarm time and automatically activate a first linked application by ending an output of the alarm when a first user input is applied during outputting the alarm.

17 Claims, 36 Drawing Sheets

FIG. 6
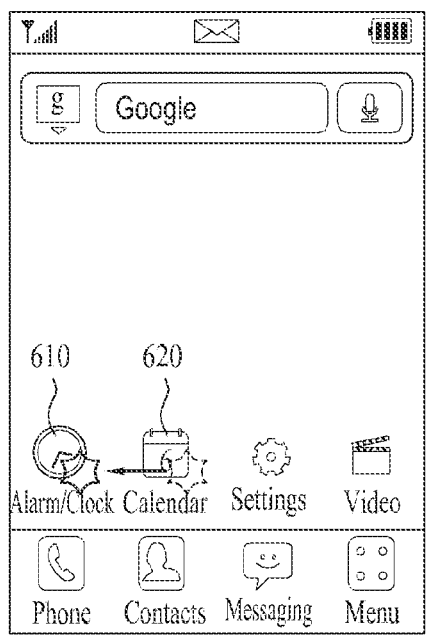
(a)
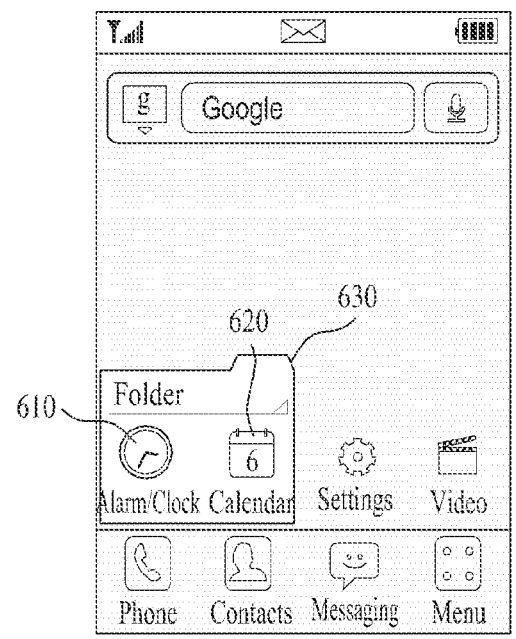
(b)
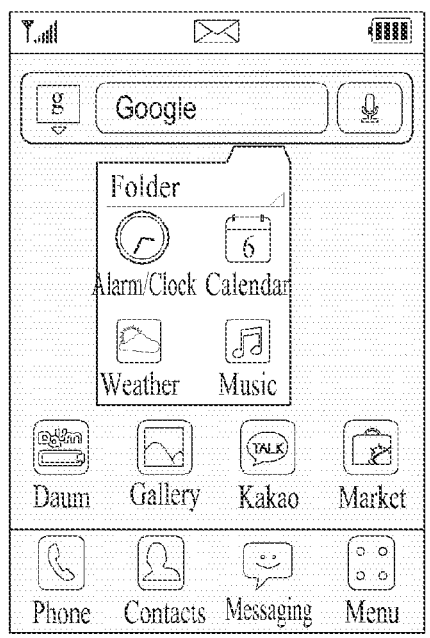
(c)

FIG. 8
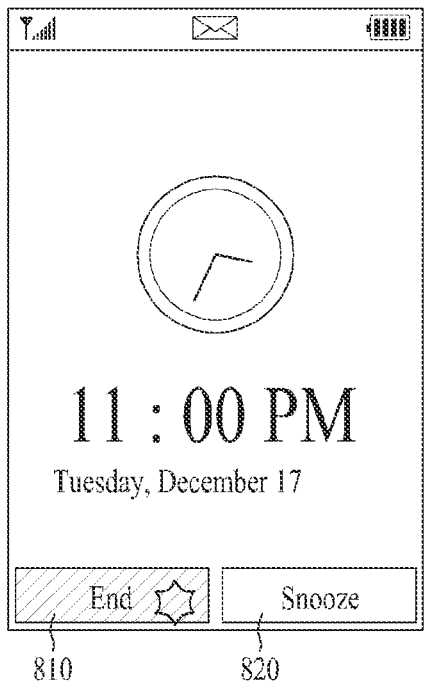
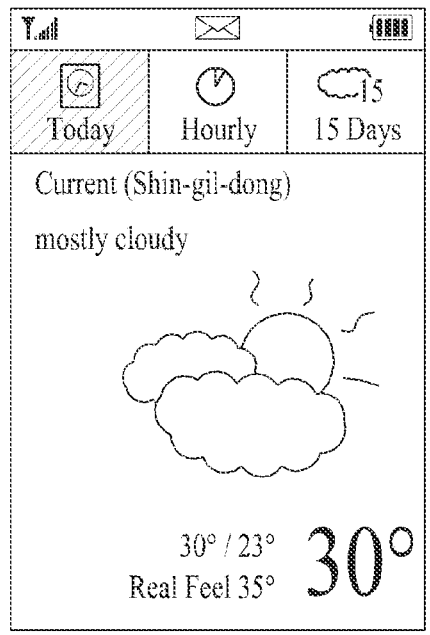
(a)
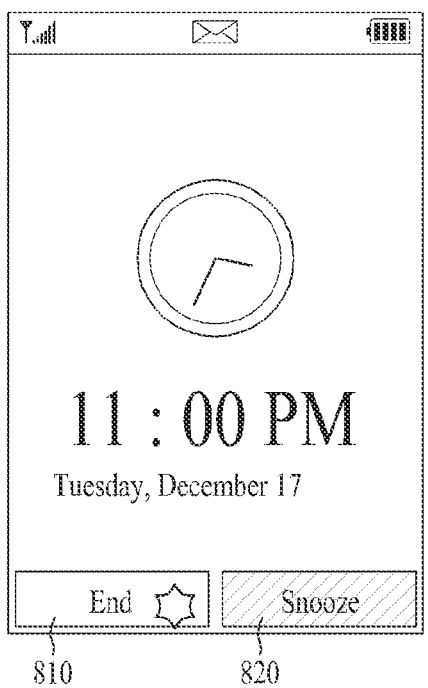
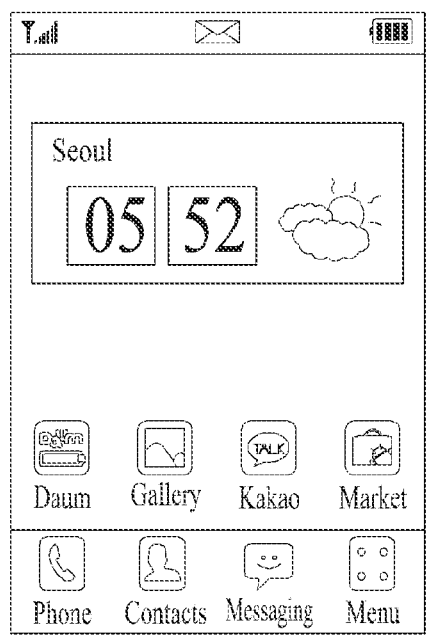
(b)

FIG. 9
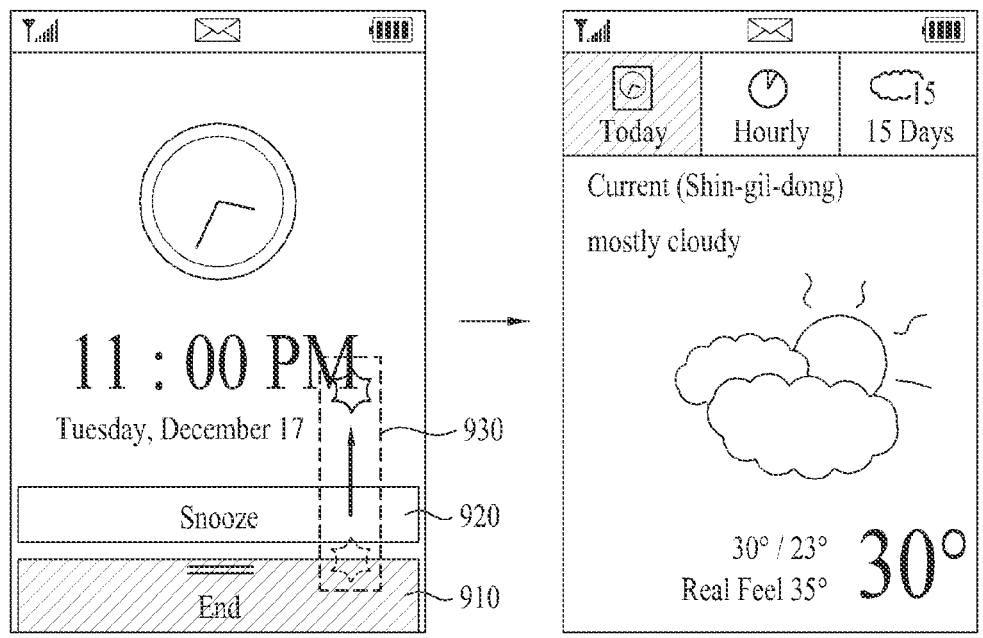
(a)
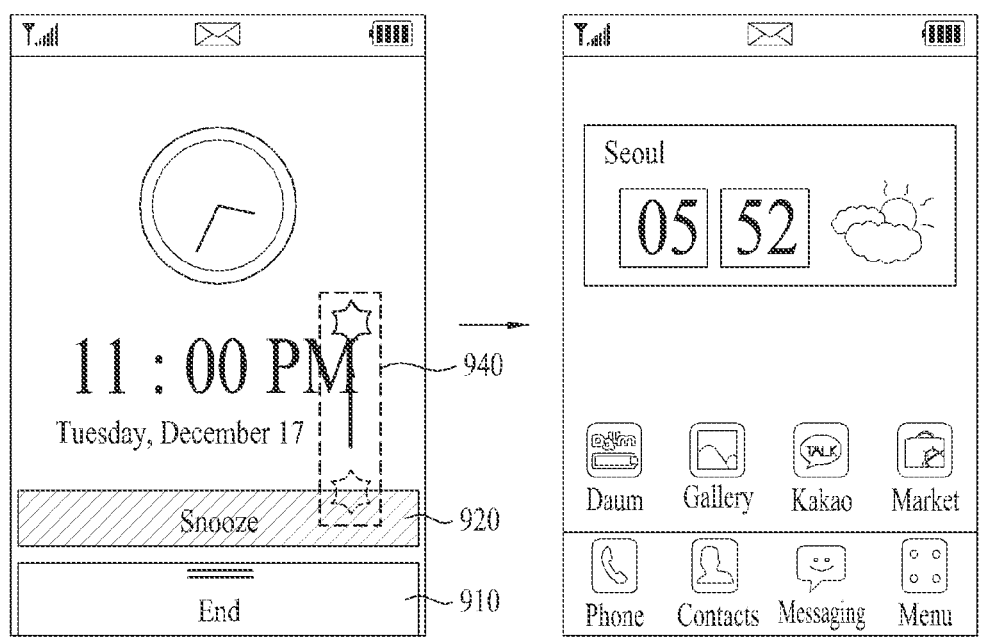
(b)

FIG. 10
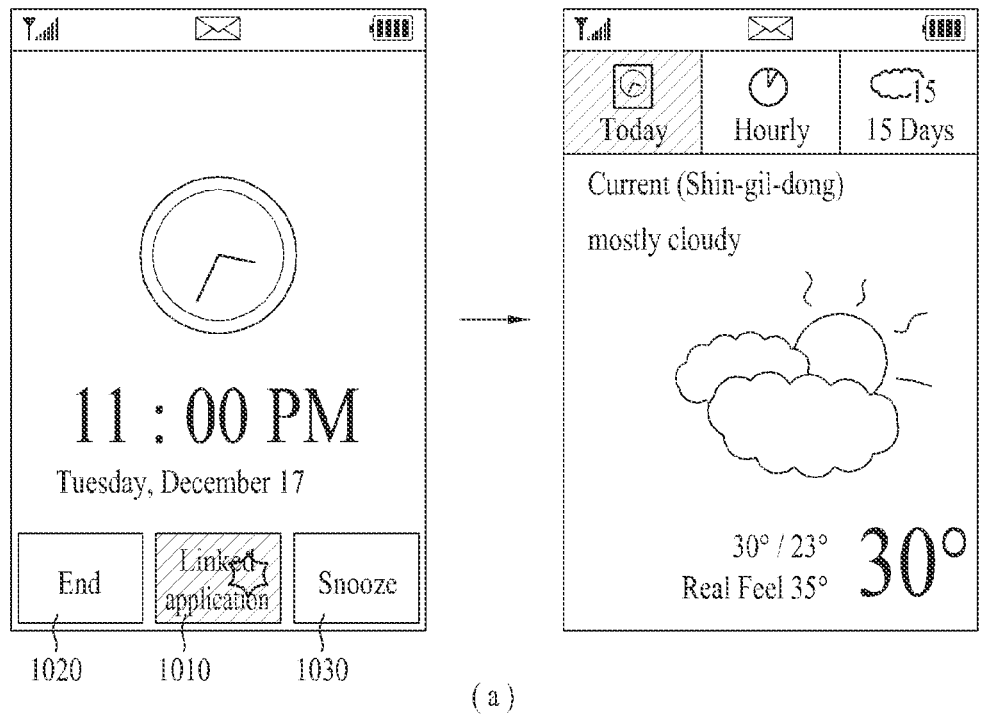
(a)
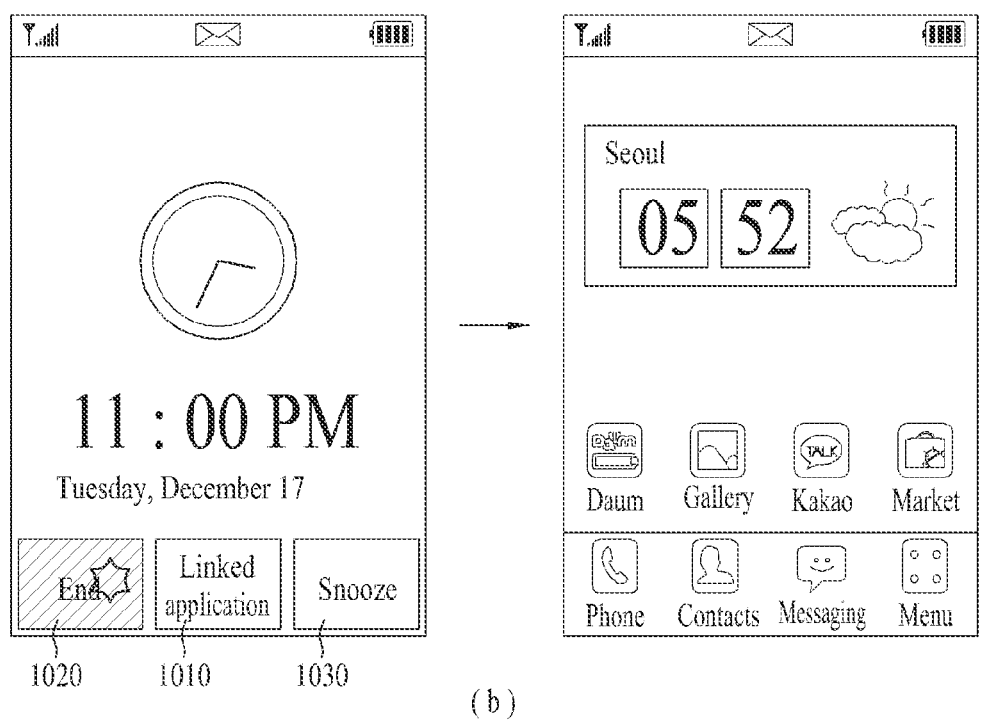
(b)

FIG. 11
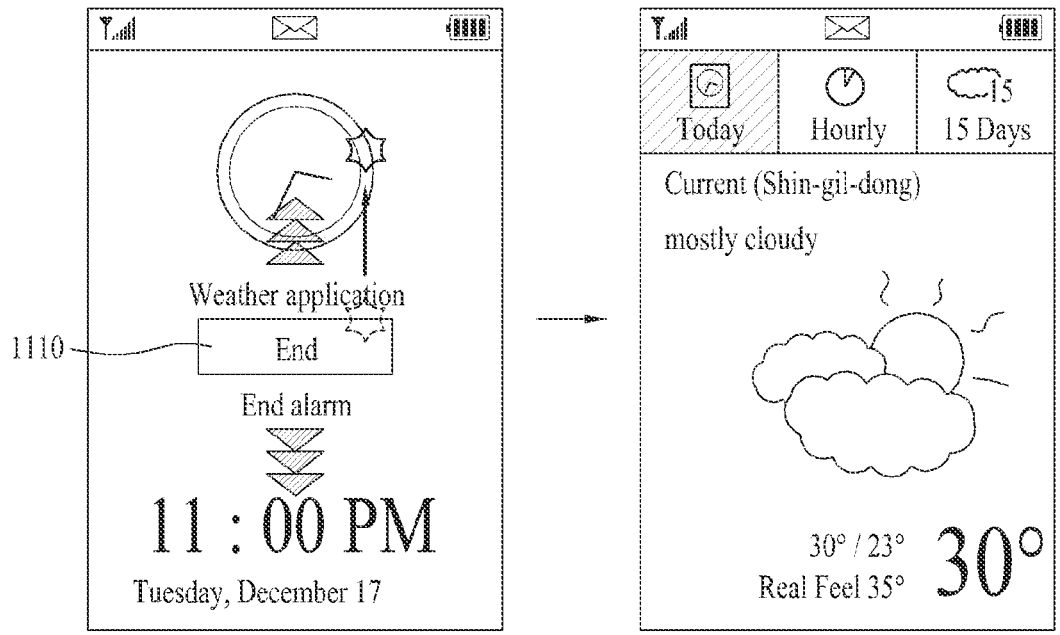
(a)
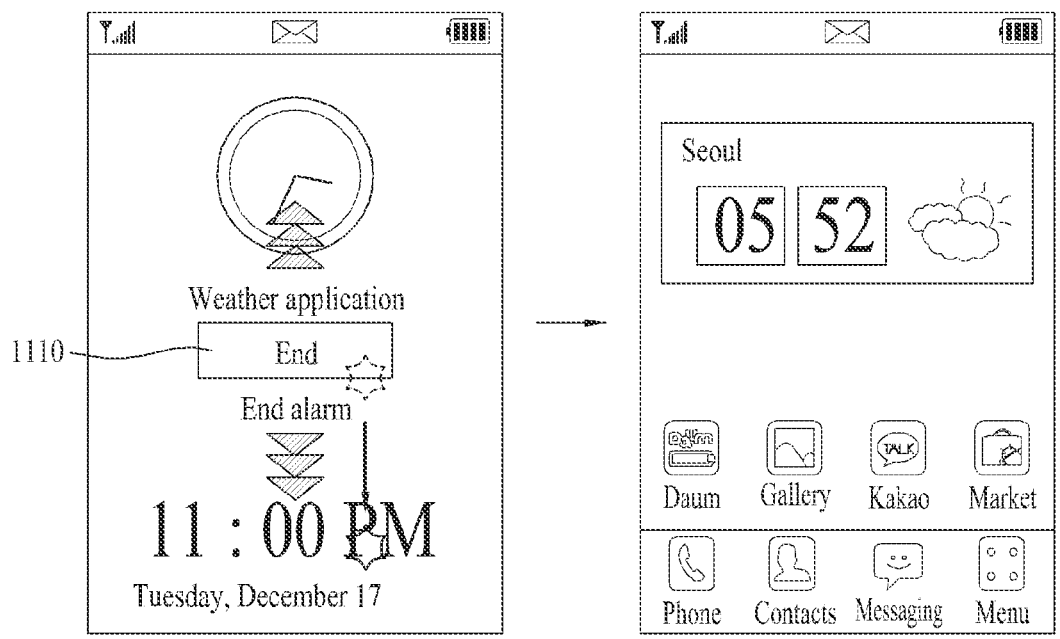
(b)

FIG. 12
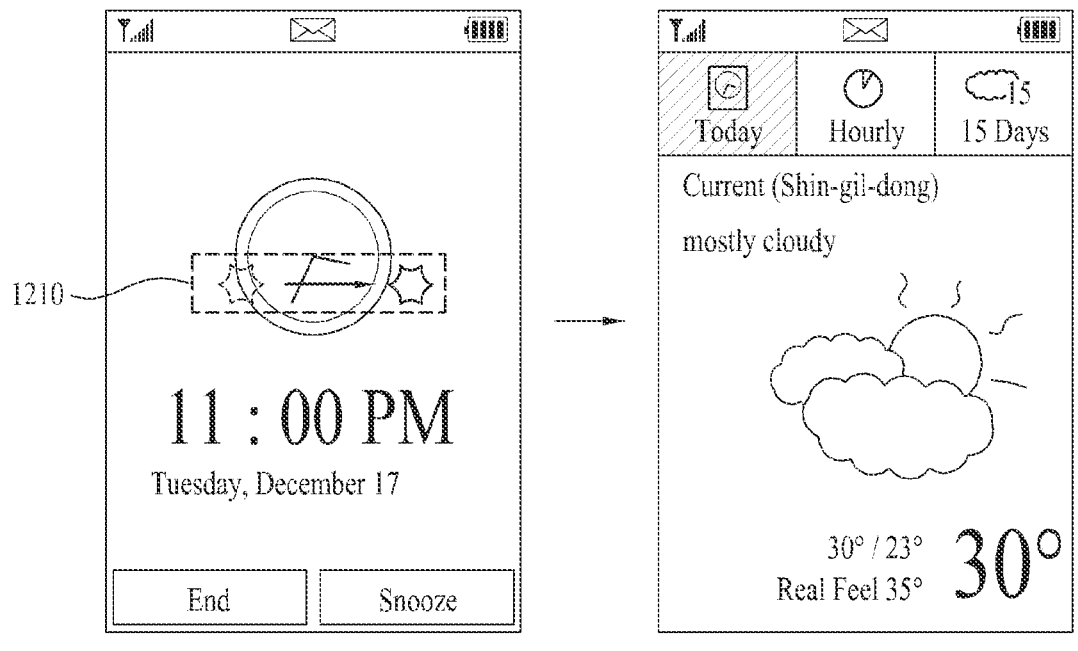
(a)
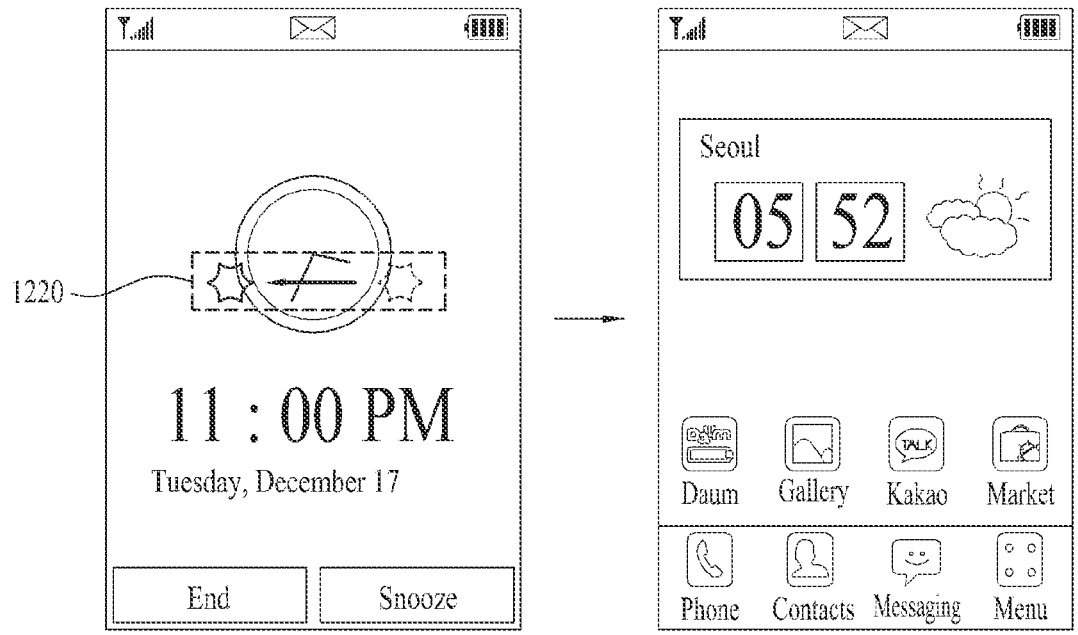
(b)

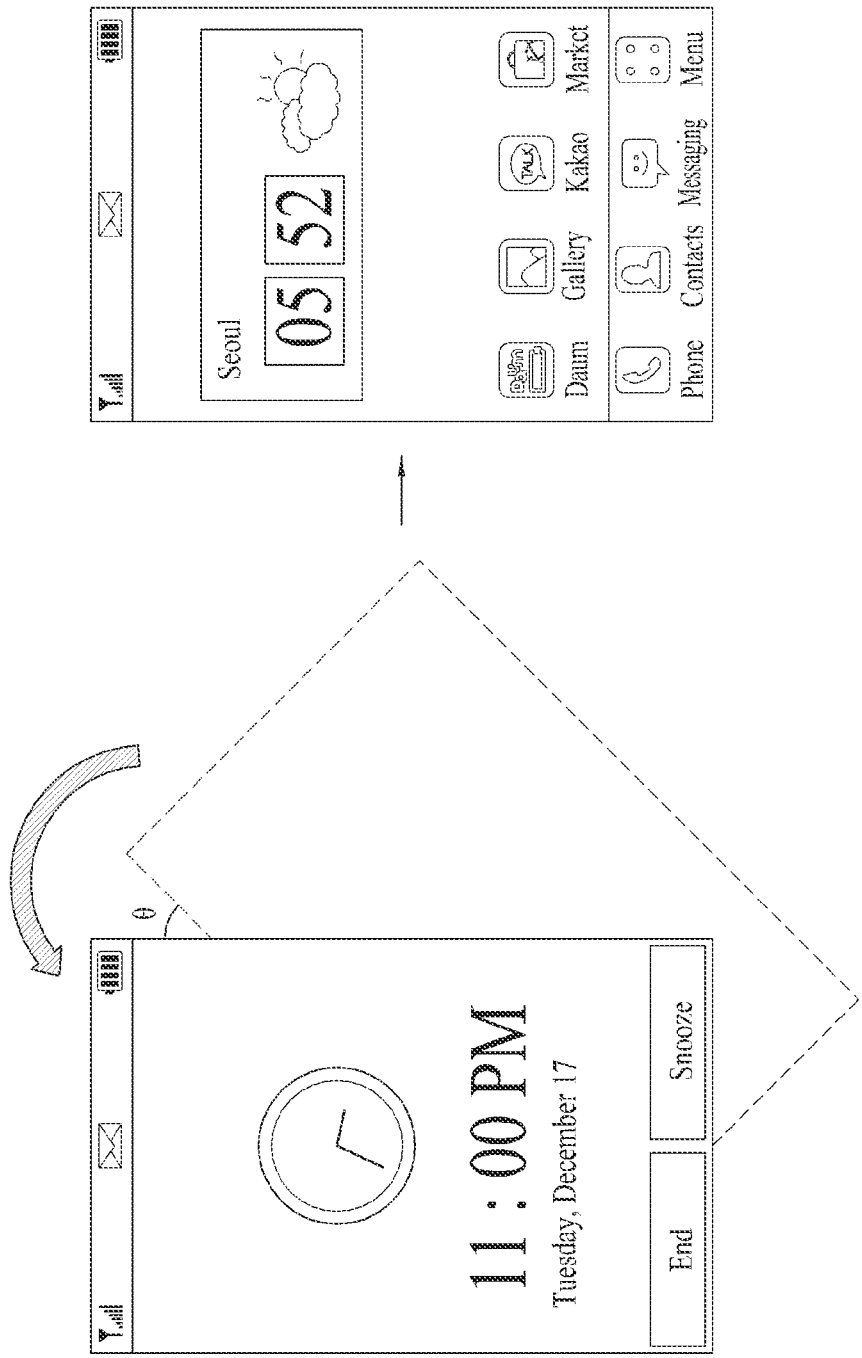

FIG. 14
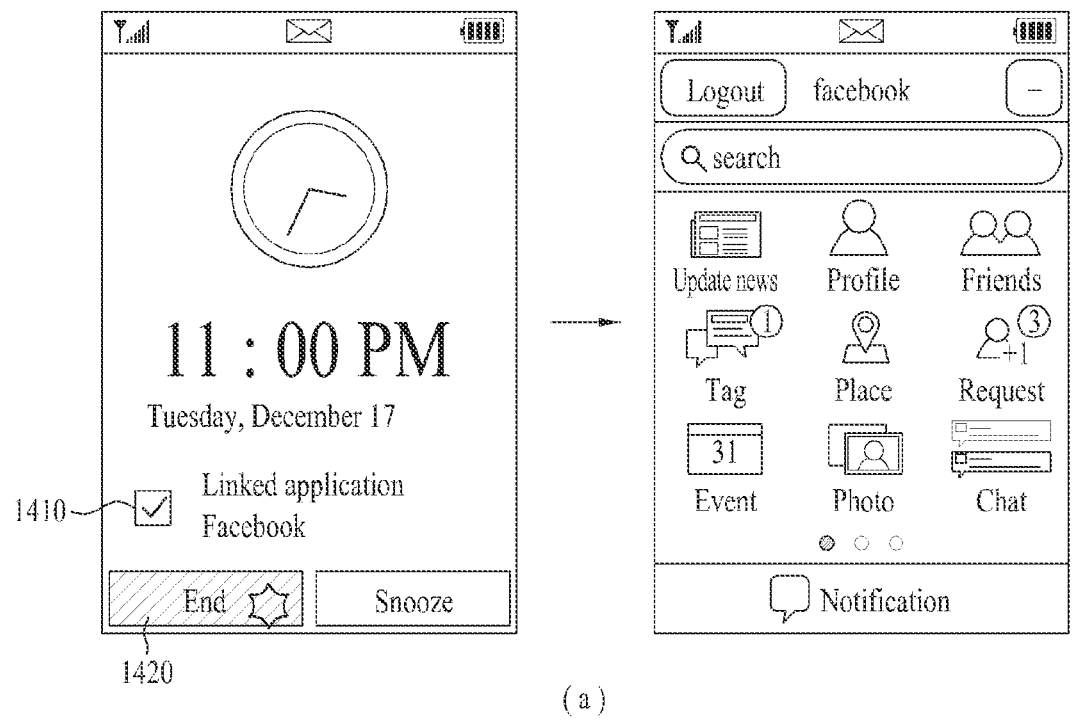
(a)
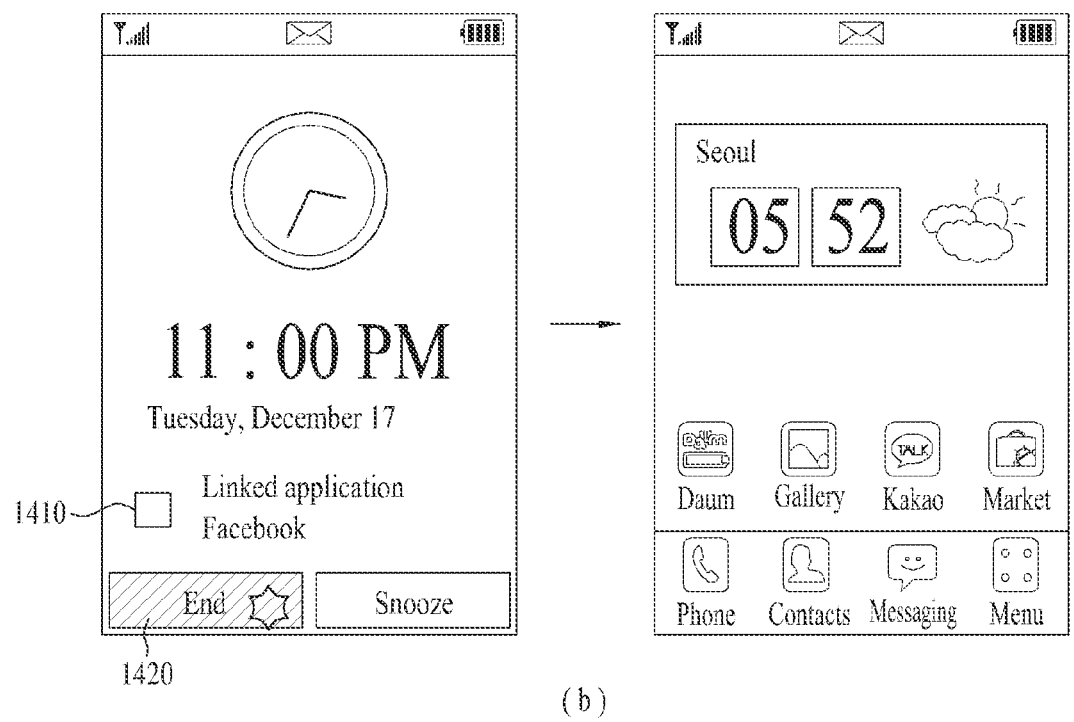
(b)

FIG. 19
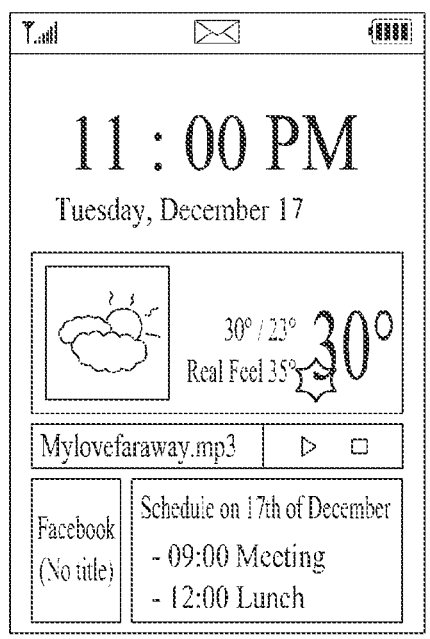
(a)
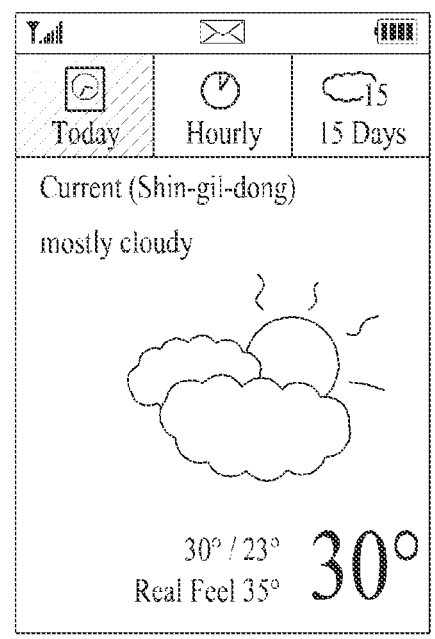
(b)

(a)          (b)

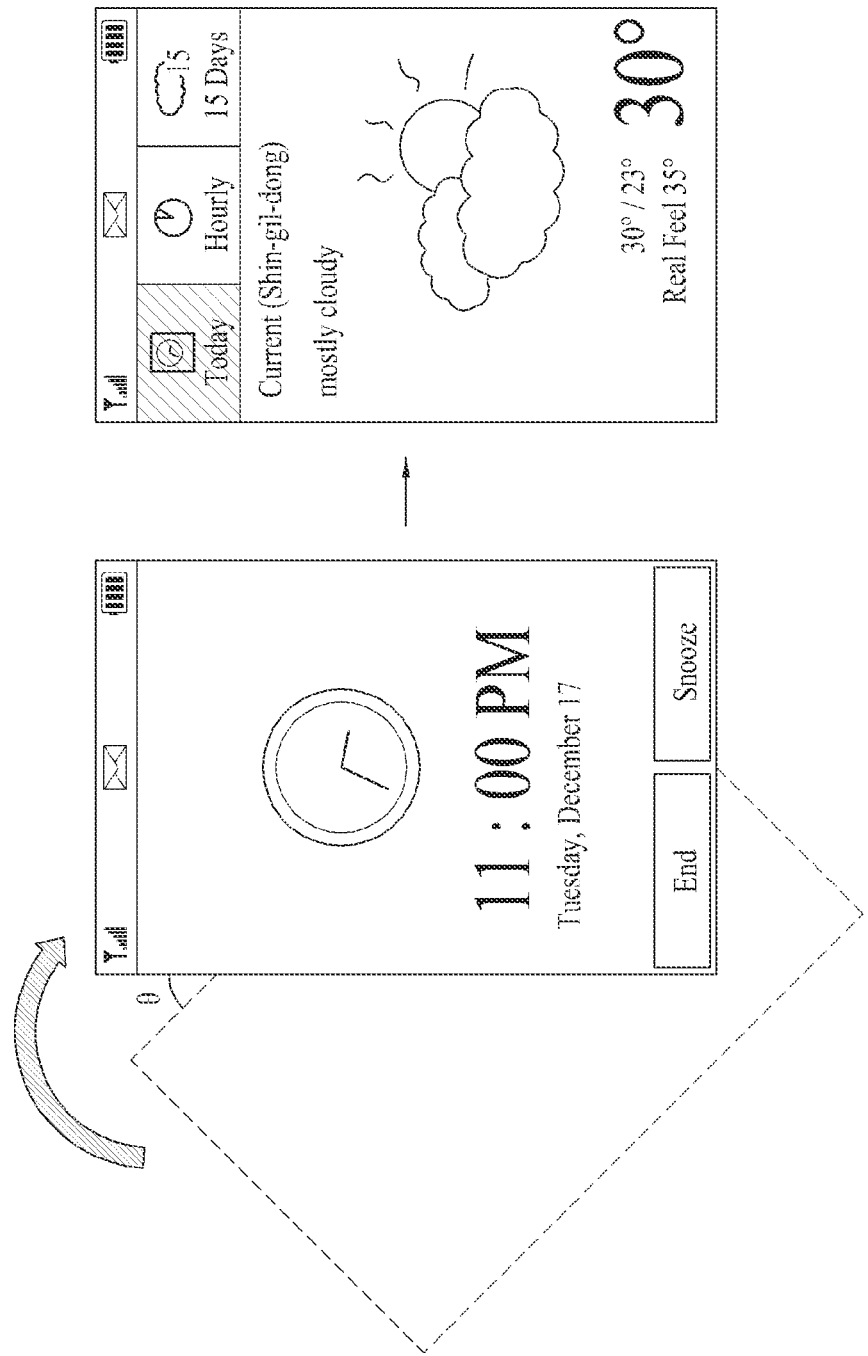

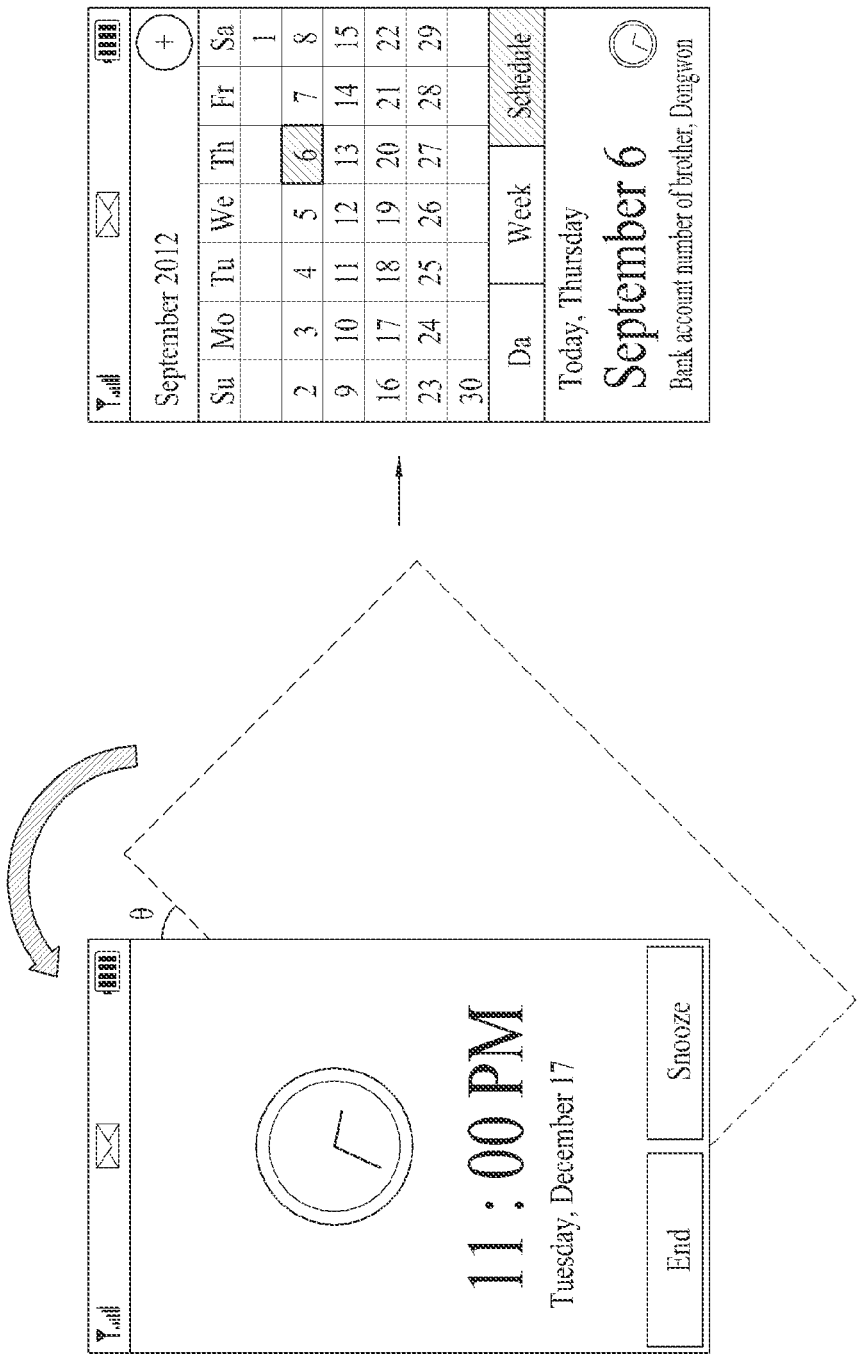

FIG. 27
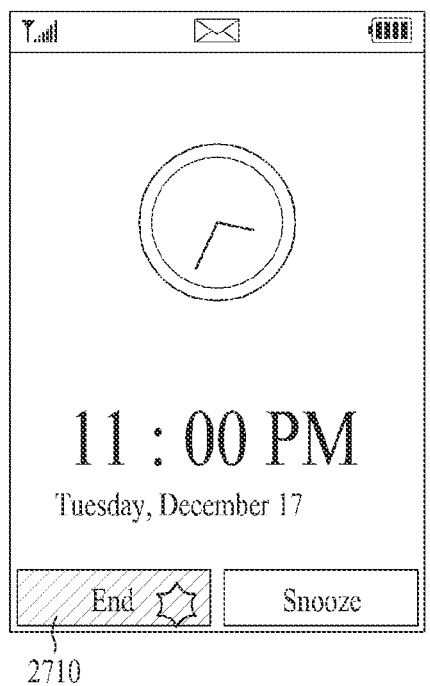
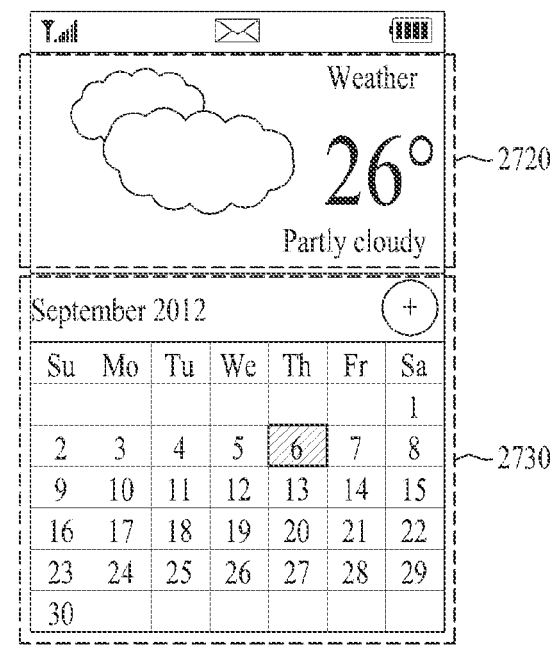
(a) (b)

FIG. 28
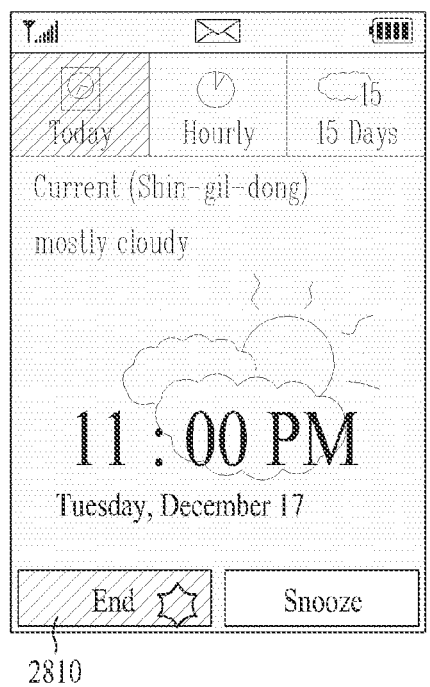
(a)
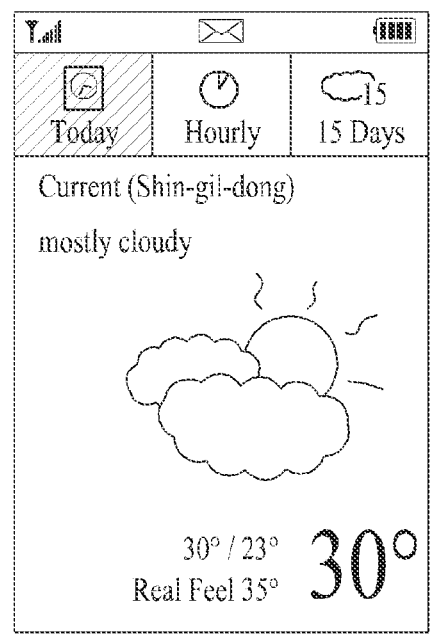
(b)

FIG. 30A
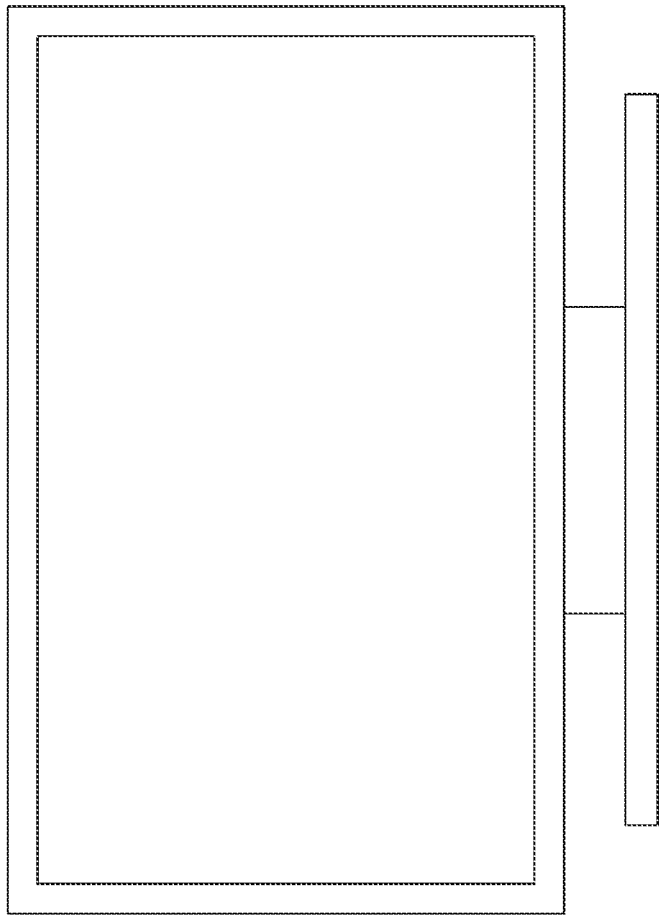
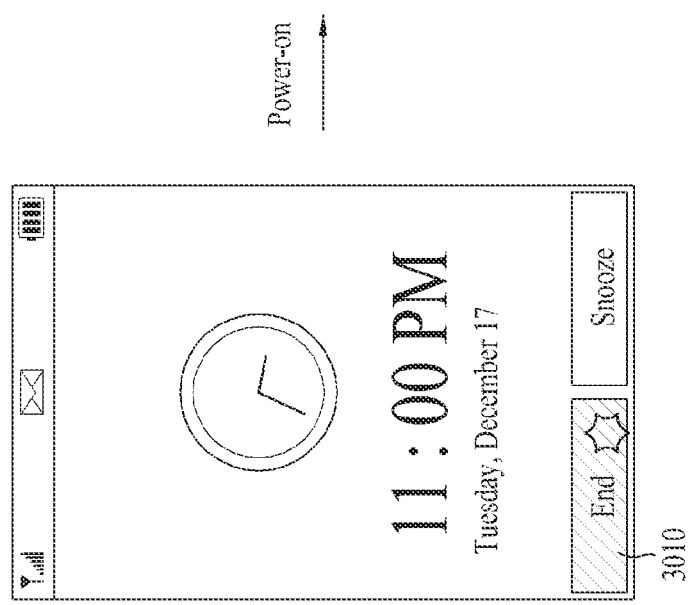

FIG. 30B
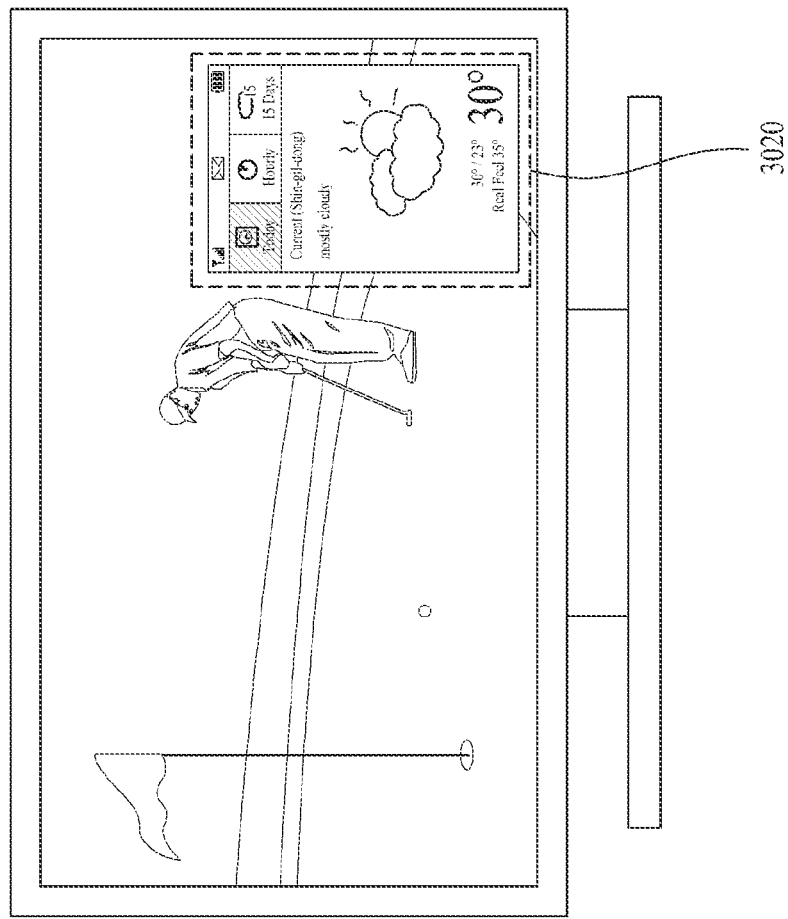
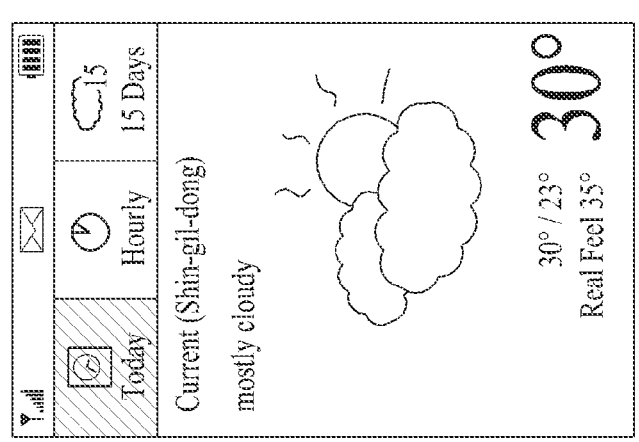

ND CONTROLLING
MOBILE TERMINAL AND CONTROLLING METHOD THEREOF

Pursuant to 35 U.S.C. §119(a), this application claims the benefit of earlier filing date and right of priority to Korean Application No. 10-2012-0101597, filed on Sep. 13, 2012, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for automatically activating a linked application if an output of an alarm is ended.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

The functional expansion of a mobile terminal makes the mobile terminal become a necessity for everyday life of a user. For example of a convenient function of a mobile terminal necessary for everyday life of a user, there is an alarm function of a mobile terminal. After a user has set up an alarm time through a mobile terminal, if a current time becomes the alarm time, the user can recognize that the set alarm time expires through an alarm sound. Particularly, since the alarm function is popularly utilized as a morning call, a user can wake up at the right time.

However, a traditional alarm function of a mobile terminal just provides a user with an alarm sound but fails to provide other informations. Hence, a user awakened by the alarm sound needs to manually activate such a separate application as an internet access and the like to check information on weather, news, date and the like. Thus, according to a related art, the user awakened by the alarm sound should search for desired information and then checks the found information by himself.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, if an output of an alarm is ended, one object of the present invention is to provide a mobile terminal and controlling method thereof, by which a linked application can be automatically activated.

Moreover, if an output of an alarm is ended, another object of the present invention is to provide a mobile terminal and controlling method thereof, by which a power of an external device can be automatically turned on.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a display unit, a memory configured to store a set alarm time, and a controller controlling an alarm to be outputted if a current hour becomes the set alarm time, the controller, if a $1^{st}$ user input is applied in the course of outputting the alarm, controlling a $1^{st}$ linked application to be automatically activated by ending an output of the alarm.

Preferably, if a $2^{nd}$ user input different from the $1^{st}$ user input is applied in the course of outputting the alarm, the controller may control the output of the alarm to be ended without activating the $1^{st}$ linked application.

More preferably, the controller may control a snooze period to be counted in response to the $2^{nd}$ user input. In this case, if the snooze period expires, the controller may control the alarm to be re-outputted.

Preferably, if a $2^{nd}$ user input different from the $1^{st}$ user input is applied in the course of outputting the alarm, the controller may end the output of the alarm and control a $2^{nd}$ linked application to be automatically activated.

Preferably, the mobile terminal may further include a wireless communication unit configured to perform a communication with an external device. And, the controller may control a power of the external device to be turned on in response to the $1^{st}$ user input.

More preferably, if the power of the external device is turned on, the controller may controls an output screen of the display unit to be mirrored on the external device.

In another aspect of the present invention, a mobile terminal according to another embodiment of the present invention may include a display unit; a memory configured to store a set alarm time; and a controller configured to control an alarm to be outputted if a current hour becomes the set alarm time and automatically activate a first linked application by ending an output of the alarm when a first user input is applied during outputting the alarm.

In a further aspect of the present invention, a method of controlling a mobile terminal according to a further embodiment of the present invention may include the steps of setting an alarm time; outputting an alarm when a current hour becomes the set alarm time; receiving a first user input; and controlling a first linked application to be activated by ending an output of the alarm in response to the first user input.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 6 is a diagram for one example to describe a process for setting an application belonging to the same folder of an activate icon of an alarm application as a linked application;

FIG. 8 and FIG. 9 are diagrams for one example to describe a process for applying a $1^{st}$ user input or a $2^{nd}$ user input in a manner of applying a touch input to a prescribed object displayed on an alarm output screen;

FIG. 10 is a diagram for another example to describe a process for applying a $1^{st}$ user input and a $2^{nd}$ user input in a manner of applying a touch input to a prescribed object displayed on an alarm output screen;

FIG. 11 is a diagram for a further example to describe a process for applying a $1^{st}$ user input and a $2^{nd}$ user input in a manner of applying a touch input to a prescribed object displayed on an alarm output screen;

FIG. 12 is a diagram for one example to describe a process for applying a $1^{st}$ user input and a $2^{nd}$ user input in a manner of applying a prescribed touch input to a touchscreen;

FIG. 13A and FIG. 13B are diagrams for one example to describe a process for applying a $1^{st}$ user input and a $2^{nd}$ user input in a manner of taking a prescribed motion via a mobile terminal;

FIG. 14 is a diagram for one example of an alarm output screen for adjusting whether to automatically activate a linked application;

FIGS. 16 to 19 are diagrams for examples to describe a process for displaying a linked application list in response to a $1^{st}$ user input;

FIG. 23A and FIG. 23B are diagrams for another example to describe a process for determining a linked application activated in response to a user input;

FIG. 27 is a diagram for one example to describe a process for outputting a plurality of applications via a touchscreen;

FIG. 28 is a diagram for one example of a process for displaying an alarm output screen overlaid on a linked application;

FIG. 30A and FIG. 30B are diagrams to describe an interoperation between a mobile terminal and an external device.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
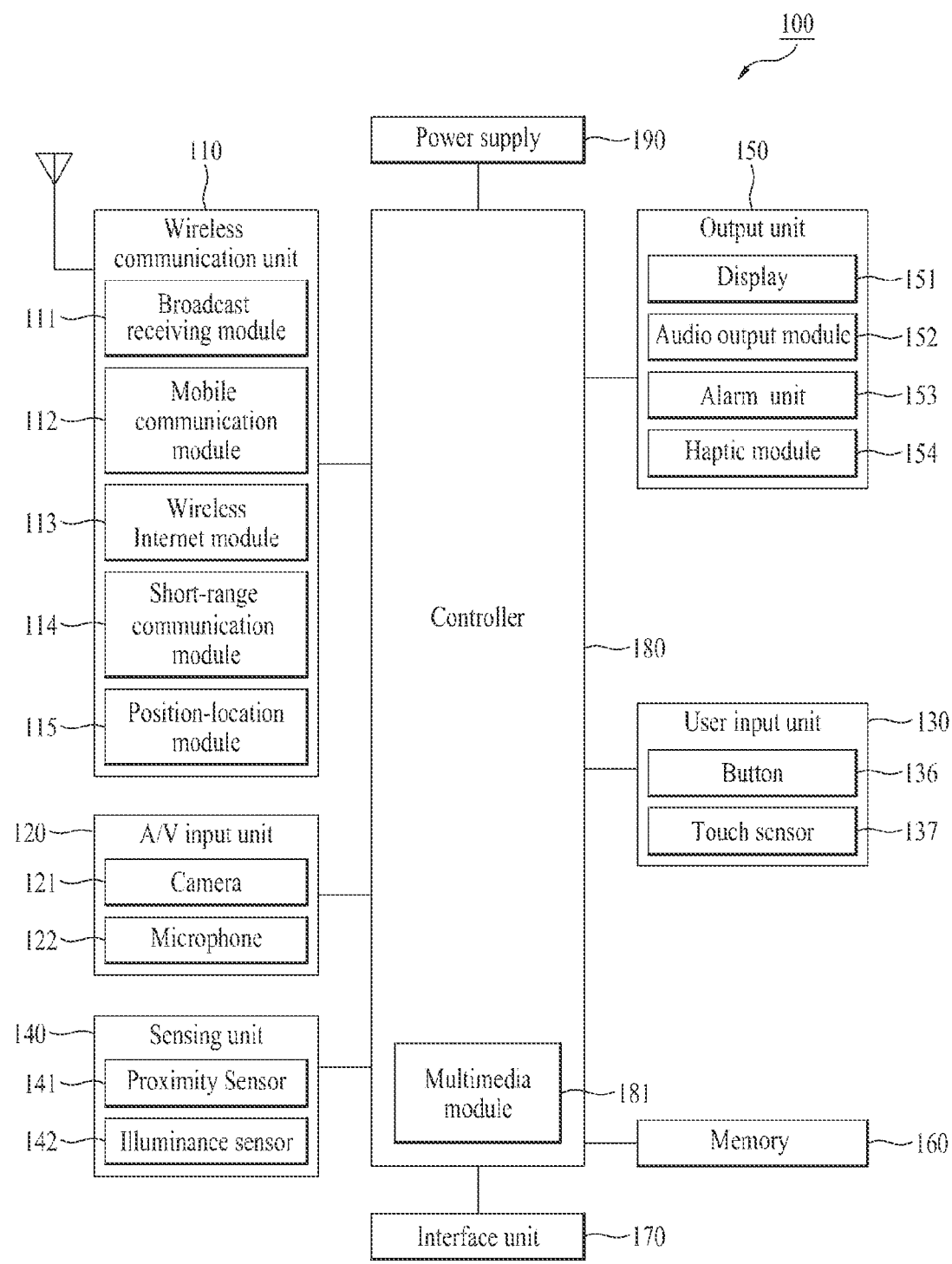
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
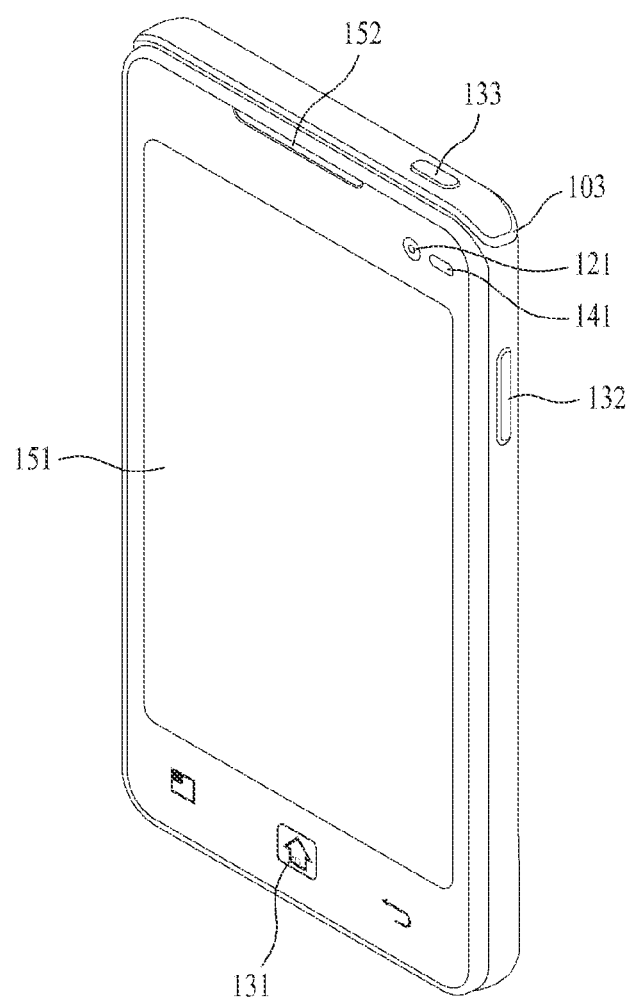
FIG. 2 is a front perspective diagram of a mobile terminal according to one embodiment of the present invention.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof.

For clarity, further disclosure will primarily relate to a bar-type mobile terminal 100. However such teachings apply equally to other types of mobile terminals.

Referring to FIG. 2A, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 3:
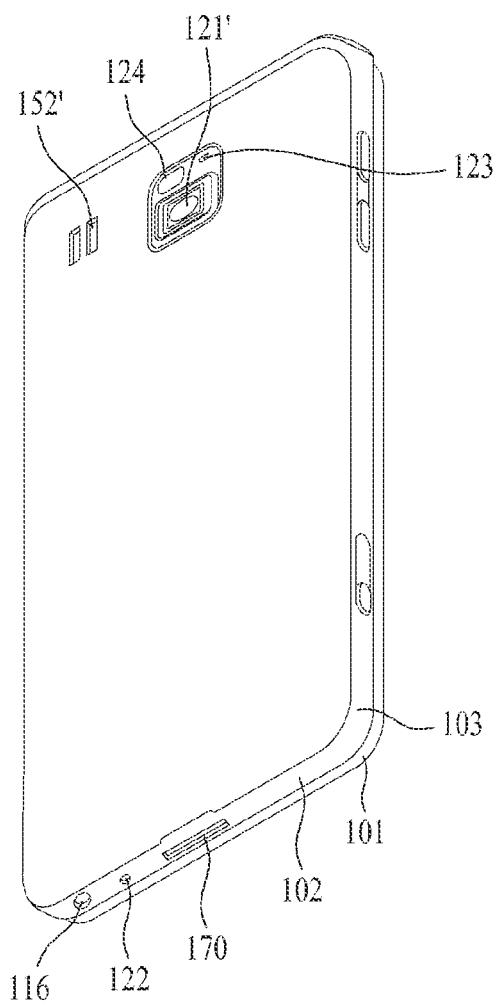
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

For clarity and convenience of the following description, assume that a mobile terminal 100 according to the present invention includes at least one of the components shown in FIG. 1. In particular, the mobile terminal 100 according to the present invention may include the display unit 151, the audio output module 152 configured to output an alarm sound, the memory 160 and the controller 180 among the components shown in FIG. 1. In some cases, the mobile terminal 100 according to the present invention may further include the wireless communication unit 110.

If the display unit 151 of the mobile terminal 100 according to the present invention includes a touchscreen 151, implementation of the following embodiments may be further facilitated. Therefore, the following description is made on the assumption that the display module 151 includes the touchscreen 151. In the following description, the mobile terminal 100 according to the present invention is described in detail with reference to the operational flowchart of the mobile terminal 100. For clarity, in describing an operation of the mobile terminal 100, a case of setting one application as a linked application and a case of setting a plurality of applications as linked applications are separately explained.

<Case of Setting a Single Application as a Linked Application>

Figure 4:
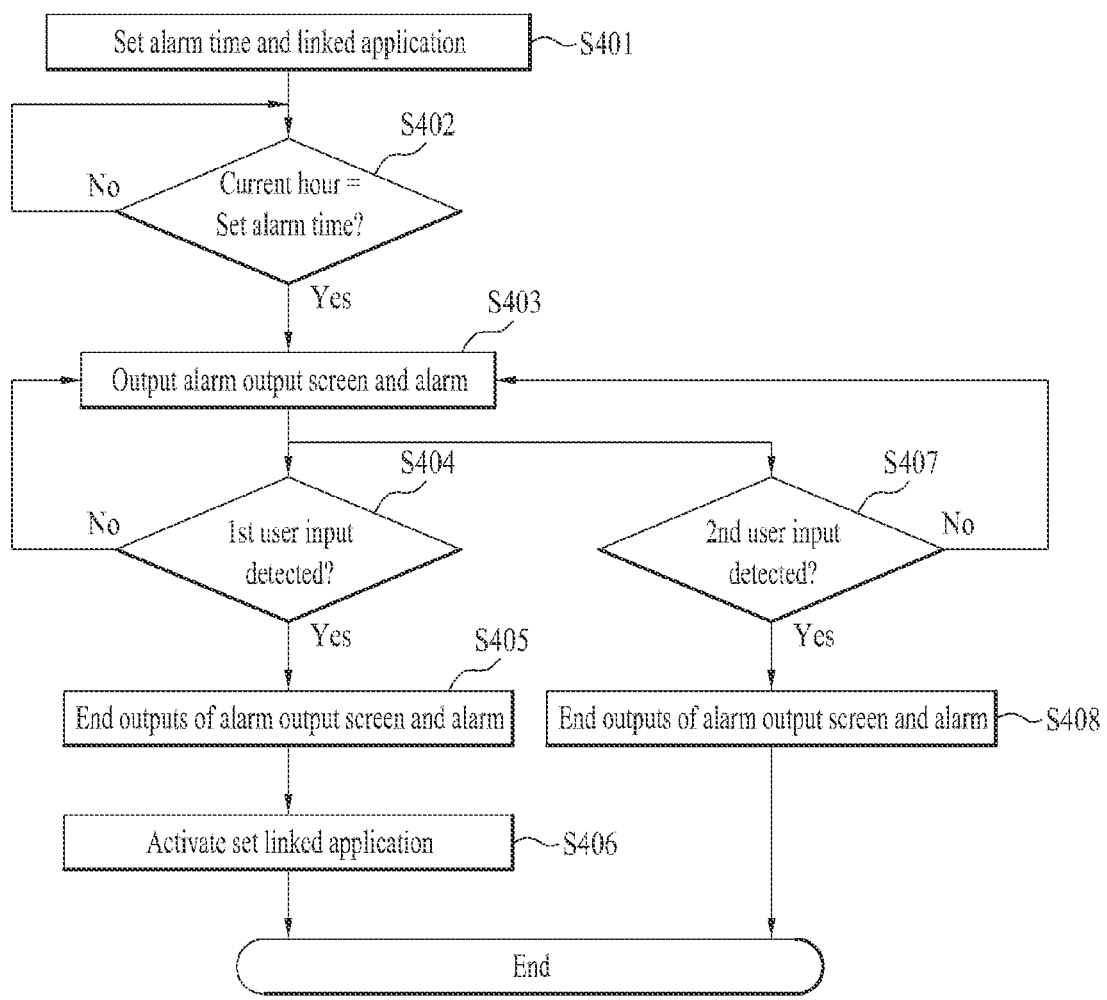
FIG. 4 is a flowchart for an operation of a mobile terminal according to one embodiment of the present invention.

FIG. 4 is a flowchart for an operation of a mobile terminal according to one embodiment of the present invention.

Referring to FIG. 4, a step S401 of setting an alarm time and a linked application is the step of setting an alarm time for outputting an alarm and a linked application to be automatically activated in case of the end of the alarm. Once the alarm time and the linked application are set, the controller 180 can save information on the set alarm time and linked application in the memory 160. A process for a user to set an alarm time and a linked application is described with reference to FIG. 5 as follows.

FIGS. 5A to 5D are diagrams for one example to describe a process for setting an alarm time and a linked application.

Figure 5A:
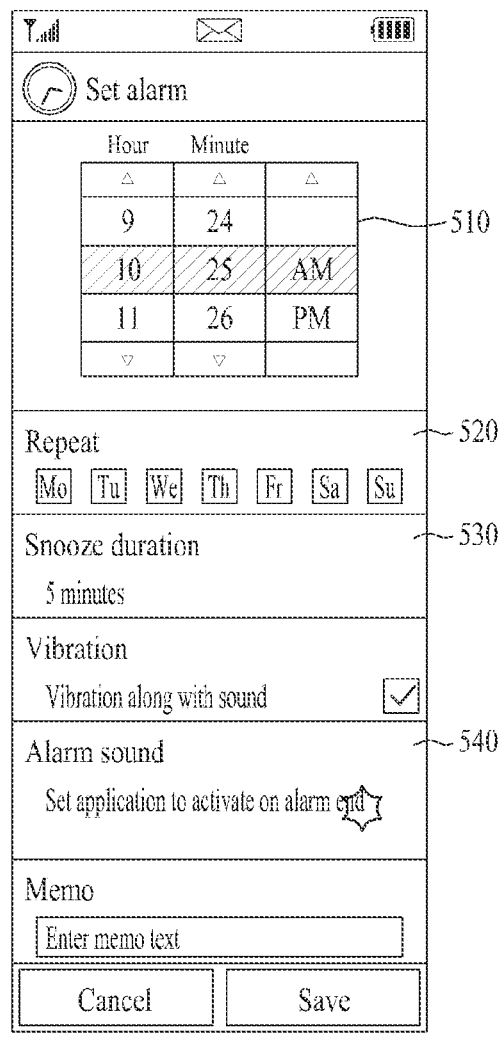
FIGS. 5A to 5D are diagrams for one example to describe a process for setting an alarm time and a linked application.

Referring to FIG. 5A, if an alarm application is activated by a user input, the controller 180 can control an alarm setting screen, which is provided to set an alarm time and a linked application, to be displayed on the touchscreen 151.

A user adjusts an hour-minute-AM/PM item 510 in the alarm setting screen shown in FIG. 5A, thereby setting an alarm time. The user can set whether to repeatedly use the set alarm time each week via a weekday repeat item 520 among the menu items shown in FIG. 5A. A re-alarm item 530 shown in FIG. 5A may be provided to set a snooze interval. In this case, the snooze interval means a time interval taken to re-output a next alarm after a pause of an output of an alarm.

If a user input is applied to a linked application item 540 in the menu screen shown in FIG. 5A, the controller 180 can control an application list to be displayed to guide a user's setting of a linked application. In displaying the application list, the controller 180 may display a list of applications installed on the mobile terminal 100. Alternatively, referring to FIG. 5B, the controller 180 may control a list of preset application candidates to be displayed. In the example shown in FIG. 5B, the application candidates may include a weather application, a calendar application, an email application, a music application and a news application. For another example, referring to FIG. 5C, the controller 180 may control a list of recently used applications to be displayed.

Figure 5B:
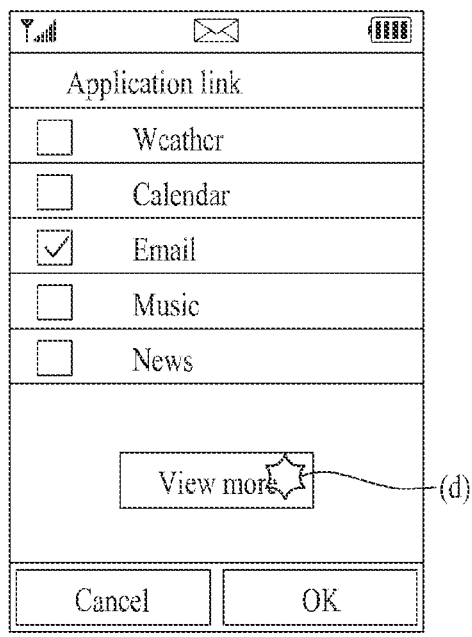
Figure 5C:
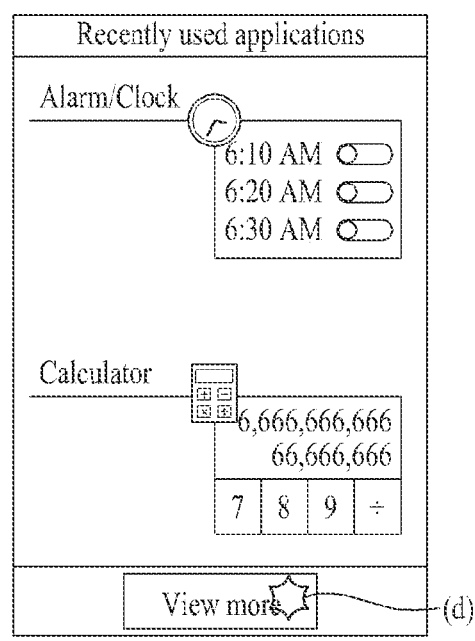
Figure 5D:
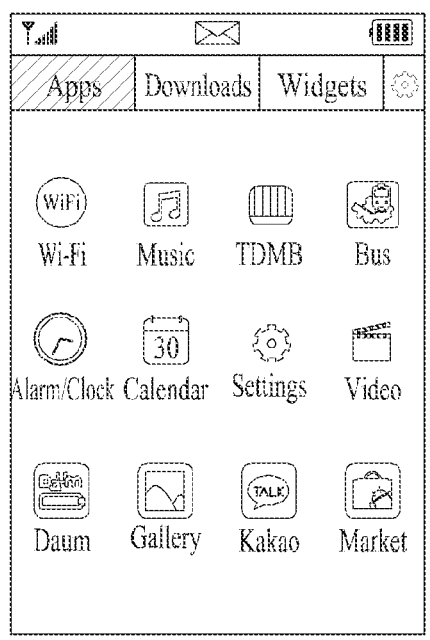

In the example shown in FIGS. 5B/5C, if a user input is applied to a more-view item, referring to FIG. 5D, the controller 180 may control a new application list to be displayed to set an application not included in the list shown in FIGS. 5B/5C as a linked application.

Although a single application may be set as a linked application through one of the application lists shown in FIGS. 5B to 5D, a plurality of applications can be set as linked applications. For instance, if a user selects a plurality of applications from one of the application lists shown in FIGS. 5B to 5D, the controller 180 can set a plurality of the selected applications as the linked applications.

In the examples shown in FIGS. 5B to 5D, a user is able to select a linked application by selecting at least one application from the corresponding application list. According to another embodiment of the present invention, the controller 180 can designate an application, which belongs to the same folder of an activate icon of an alarm application, as a linked application. This is described in detail with reference to FIG. 6 as follows.

FIG. 6 is a diagram for one example to describe a process for setting an application belonging to the same folder of an activate icon of an alarm application as a linked application.

Referring to FIG. 6, if an activate icon 620 of a prescribed application (e.g., a calendar application in the example shown in FIG. 6(a)) to be set as a linked application is dragged & dropped onto an activate icon 610 of an alarm application [FIG. 6 (a)], the controller 180 can control the activate icon 610 of the alarm application and an activate icon 620 of a prescribed application to belong to the same folder 630 [FIG. 6 (b)]. On the other hand, if the activate icon 610 of the alarm application is dragged & dropped onto the activate icon 620 of the prescribed application in a direction opposite to the user input direction shown in FIG. 6 (a), the controller 180 can control the activate icon 610 of the alarm application and the activate icon 620 of the prescribed application to belong to the same folder 630 [not shown in the drawing].

If both of the activate icon 610 of the alarm application and the activate icon 620 of the prescribed application belong to the same folder, the controller 180 can set the prescribed application as the linked application. Referring to FIG. 6 (c), in case that activate icons of a plurality of applications belong to the same folder of the activate icon of the alarm application, the controller 180 may set a plurality of the applications as linked applications all. In the example shown in FIG. 6 (c), a calendar application, a weather application and a music application (or a music player) may be set as the linked applications.

If the user completes the settings of the alarm time and the linked application(s), the controller 180 can control alarm information to be displayed on the touchscreen 151. In this case, the alarm information may include information on the set alarm time, information on the set linked application(s) and the like.

Figure 7:
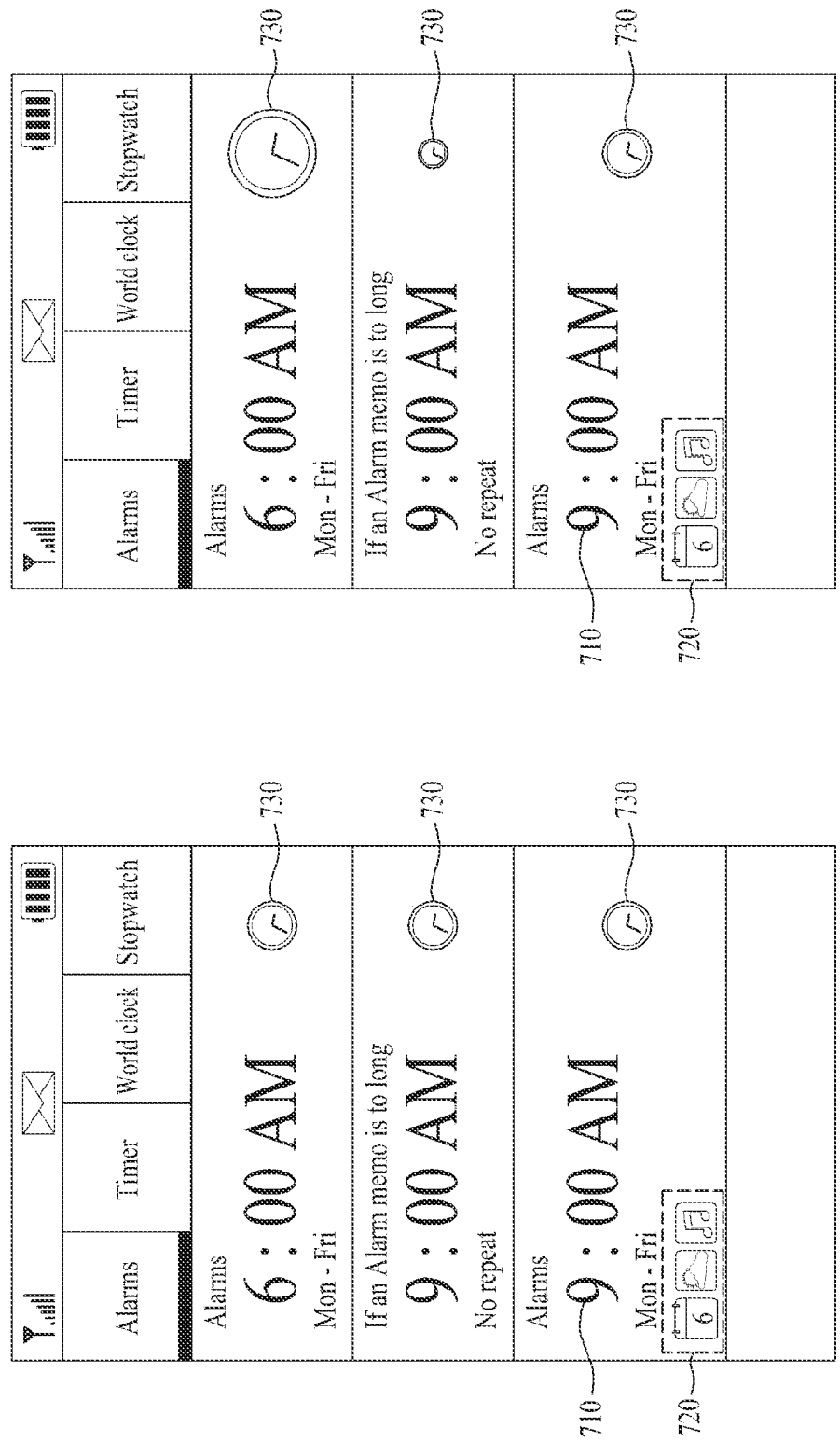
FIG. 7 is a diagram for one example to describe a process for displaying alarm information on a touchscreen.

FIG. 7 is a diagram for one example to describe a process for displaying alarm information on a touchscreen.

Referring to FIG. 7, the controller 180 can control a set alarm time 710 and a set linked application information 720 to be displayed. Based on alarm information displayed on the touchscreen 151, a user can recognize the set alarm information and a linked application, which can be automatically activated when a set alarm is ended. In displaying the alarm information, the controller 180 can control an alarm indicator, which is assigned to each alarm information, to be displayed. The user is able to adjust whether to cancel the set alarm time by touching the alarm indicator in a display image of the alarm information list shown in FIG. 7. Moreover, the user can set up a significance of the set alarm time. For instance, referring to FIG. 7 (b), the user can set the significance of the set alarm by adjusting a size of the alarm indicator 730. Alternatively, the user can set up the significance of the alarm time by adjusting a color of the alarm indicator 730 or inputting a significance level per the set alarm time [not shown in the drawing]. The significance of the set alarm time may be used as a factor for determining an output strength of the alarm if a current hour becomes the set alarm time. In particular, the controller 180 of the present invention can control an alarm sound of a higher sound level or a vibration of a higher strength if the set alarm time is more significant.

As mentioned in the foregoing descriptions with reference to FIG. 5 and FIG. 6, a user can set a plurality of applications as linked applications. Yet, for clarity, assume that a single application can be set as a linked application in FIG. 4. And, if a plurality of applications are set as linked applications, an operation of the mobile terminal 100 shall be described later.

Referring now to FIG. 4, if the current hour is determined as the set alarm time [S402], the controller 180 can control both an alarm output screen and an alarm to be outputted together [S403]. The controller 180 outputs at least one of a preset alarm sound and a vibration, thereby controlling the alarm to be outputted. As mentioned in the foregoing description with reference to FIG. 7 (b), the controller 180 can adjust the output strength of the alarm in accordance with the significance of the set alarm time.

Subsequently, if a $1^{st}$ user input is applied to the alarm output screen [S404], the controller 180 stops outputting the alarm output screen and the alarm [S405] and is able to activate the set linked application [S406]. If a $2^{nd}$ user input different from the $1^{st}$ user input is applied to the alarm output screen [S407], the controller 180 skips the linked application activating step and controls the outputs of the alarm output screen and the alarm to be ended [S408].

Each of the $1^{st}$ user input and the $2^{nd}$ user input may include a predefined touch input applied to a prescribed object displayed on the alarm output screen. For another instance, each of the $1^{st}$ user input and the $2^{nd}$ user input may include an action of moving the mobile terminal 100.

Various examples of the $1^{st}$ user input and the $2^{nd}$ user input shall be described in detail with reference to the accompanying drawings.

FIG. 8 and FIG. 9 are diagrams for one example to describe a process for applying a $1^{st}$ user input or a $2^{nd}$ user input in a manner of applying a touch input to a prescribed object displayed on an alarm output screen.

Referring to FIG. 8 and FIG. 9, a user can apply a $1^{st}$ user input or a $2^{nd}$ user input by applying a predetermined touch input to a prescribed object displayed on an alarm output screen.

In the example shown in FIG. 8, if a user touches an end button 810, it is defined as the $1^{st}$ user input [FIG. 8 (a)]. If a user touches a snooze button 820, it is defined as the $2^{nd}$ user input [FIG. 8 (b)]. If the $1^{st}$ user input is applied, as shown in FIG. 8 (a), the controller 180 stops outputting an alarm output screen and an alarm and may control a linked application to be automatically executed. On the other hand, if the $2^{nd}$ user input is inputted, as shown in FIG. 8 (b), the controller 180 may stop outputting the alarm output screen and the alarm without executing the linked application.

In the example shown in FIG. 9, if a user takes an action 930 of flicking an end button 910 in a prescribed direction (e.g., in a direction of a topside of the touchscreen 151), it is defined as the $1^{st}$ user input [FIG. 9 (a)]. If a user takes an action 940 of flicking a snooze button 920 in a prescribed direction (e.g., in a direction of a topside of the touchscreen 151), it is defined as the $2^{nd}$ user input [FIG. 9 (b)]. If the $1^{st}$ user input is applied, as shown in FIG. 9 (a), the controller 180 stops outputting an alarm output screen and an alarm and may control a linked application to be automatically executed. On the other hand, if the $2^{nd}$ user input is inputted, as shown in FIG. 9 (b), the controller 180 may stop outputting the alarm output screen and the alarm without executing the linked application.

As mentioned in the above descriptions with reference to FIG. 8 and FIG. 9, in case that the $2^{nd}$ user input is provided to activate a snooze function, the controller 180 stops outputting the alarm output screen and the alarm and can control a snooze period to be counted, in response to the $2^{nd}$ user input. Thereafter, if the snooze period expires, the controller 180 can control the alarm output screen and the alarm to be re-outputted to re-execute the following steps S403 and the like.

In the examples shown in FIG. 8 and FIG. 9, the $1^{st}$ user input is applied in a manner of applying the predefined touch input to the end button and the $2^{nd}$ user input is applied in a manner of applying the predetermined touch input to the snooze button. Yet, it may be unnecessary to apply the $1^{st}/2^{nd}$ user input in a manner of applying the predefined touch input to the end/snooze button.

For instance, referring to FIG. 10, the controller 180 can control an alarm output screen including a linked application button 101 to be outputted. In the example shown in FIG. 10, a user touches the linked application button 101, thereby applying a $1^{st}$ user input. The user touches an end button 1020 or a snooze button 1020, thereby applying a $2^{nd}$ user input. In FIG. 10 (b), the end button 1020 is touched to apply the $2^{nd}$ user input. Referring to FIG. 10 (a), if the $1^{st}$ user input is applied, the controller 180 stops outputting the alarm output screen and the alarm and can control a linked application to be automatically executed. On the other hand, referring to FIG. 10 (b), if the $2^{nd}$ user input is applied, the controller 180 can stop outputting the alarm output screen and the alarm without executing the linked application. In the example shown in FIG. 120, if the $2^{nd}$ user input is applied by touching the snooze button 1030, as mentioned in the foregoing description with reference to FIG. 9 (b), it is able to stop outputting the alarm output screen and the alarm while counting a snooze period.

In the example shown in FIG. 10, only if a set linked application exists, the controller 180 may control the linked application button 1010 to be activated. In particular, if the set linked application does not exist, the linked application button 1010 is not displayed on the alarm output screen or a mode for preventing a user from selecting the linked application button can be entered.

In the examples shown in FIGS. 8 to 10, the $1^{st}$ user input and the $2^{nd}$ user input are applied in a manner of applying touch inputs to different objects, respectively. Yet, unlike the examples shown in FIGS. 8 to 10, it may not be necessary to apply the $1^{st}$ user input and the $2^{nd}$ user input in a manner of applying touch inputs to different objects, respectively. Alternatively, each of the $1^{st}$ user input and the $2^{nd}$ user input may be applied in a manner of applying touch inputs of different types to a prescribed object displayed on the alarm output screen, respectively.

For instance, referring to FIG. 11, a $1^{st}$ user input is performed in a manner of flicking an end button 1110 displayed on an alarm output screen in a $1^{st}$. direction (e.g., a top direction) [FIG. 11 (a)]. And, a $2^{nd}$ user input is performed in a manner of flicking the end button 1110 in a $2^{nd}$ direction (e.g., a bottom direction) [FIG. 11 (b)]. In the example shown in FIG. 11, the $1^{st}$ user input may include a $1^{st}$ touch input applied to a prescribed object on the alarm output screen and the $2^{nd}$ user input may include a $2^{nd}$ touch input applied to the prescribed object on the alarm output screen.

In the examples shown in FIGS. 8 to 11, a predefined touch input includes an action of touching a prescribed object and an action of flicking a prescribed object in a prescribed direction. In addition to the examples shown in FIGS. 8 to 11, the predefined touch input may include one of an action of tapping a prescribed object as many times as a prescribed count, an action of dragging a prescribed object to a predefined region and the like.

In the examples shown in FIGS. 8 to 11, it is able to apply each of the $1^{st}$ user input and the $2^{nd}$ user input in a manner of applying a touch input to a prescribed object displayed on the alarm output screen. Yet, unlike the examples shown in FIGS. 8 to 11, it may not be necessary to apply each of the $1^{st}$ user input and the $2^{nd}$ user input in a manner of applying a touch input to a prescribed object. For another instance, a user can apply the $1^{st}$ or $2^{nd}$ user input in a manner of applying a predefined touch input to the touchscreen 151 while the alarm output screen is being outputted.

For instance, referring to FIG. 12, a $1^{st}$ user input includes an action 1210 of flicking a pointer in a $1^{st}$ direction (e.g., a right direction) [FIG. 12 (a)]. And, a $2^{nd}$ user input includes an action 1220 of flicking a pointer in a $2^{nd}$ direction (e.g., a left direction) [FIG. 12 (b)]. While the alarm screen is outputted, if the $1^{st}$ user input is applied, the controller 180 stops outputting the alarm output screen and the alarm and controls a linked application to be executed [FIG. 12 (a)]. On the other hand, while the alarm screen is outputted, if the $2^{nd}$ user input is applied, the controller 180 can stop outputting the alarm output screen and the alarm without executing the linked application [FIG. 12 (b)].

If the $2^{nd}$ user input is provided to activate a snooze function, the controller 180 stops outputting the alarm output screen and the alarm and can count a snooze period.

In the example shown in FIG. 12, a predetermined touch input includes an action of applying a flicking input to the touchscreen 151 in a prescribed direction. In addition to the example shown in FIG. 12, the predefined touch input may include one of an action of tapping the touchscreen 151 as many times as a prescribed count, an action of drawing a predefined pattern on the touchscreen 151 and the like.

In the examples shown in FIGS. 8 to 12, it is able to apply each of the $1^{st}$ user input and the $2^{nd}$ user input in a manner of applying a touch input to the touchscreen 151. Yet, it may not be necessary to apply each of the $1^{st}$ user input and the $2^{nd}$ user input in a manner of applying a touch input to the touchscreen 151. According to another embodiment of the present invention, a user can apply the $1^{st}$ or $2^{nd}$ user input in a manner of taking a motion using the mobile terminal 100. In particular, the $1^{st}$ user input can be applied by taking a $1^{st}$ motion using the mobile terminal 100 and the $2^{nd}$ user input can be applied by taking a $2^{nd}$ motion using the mobile terminal 100.

Figure 13A:
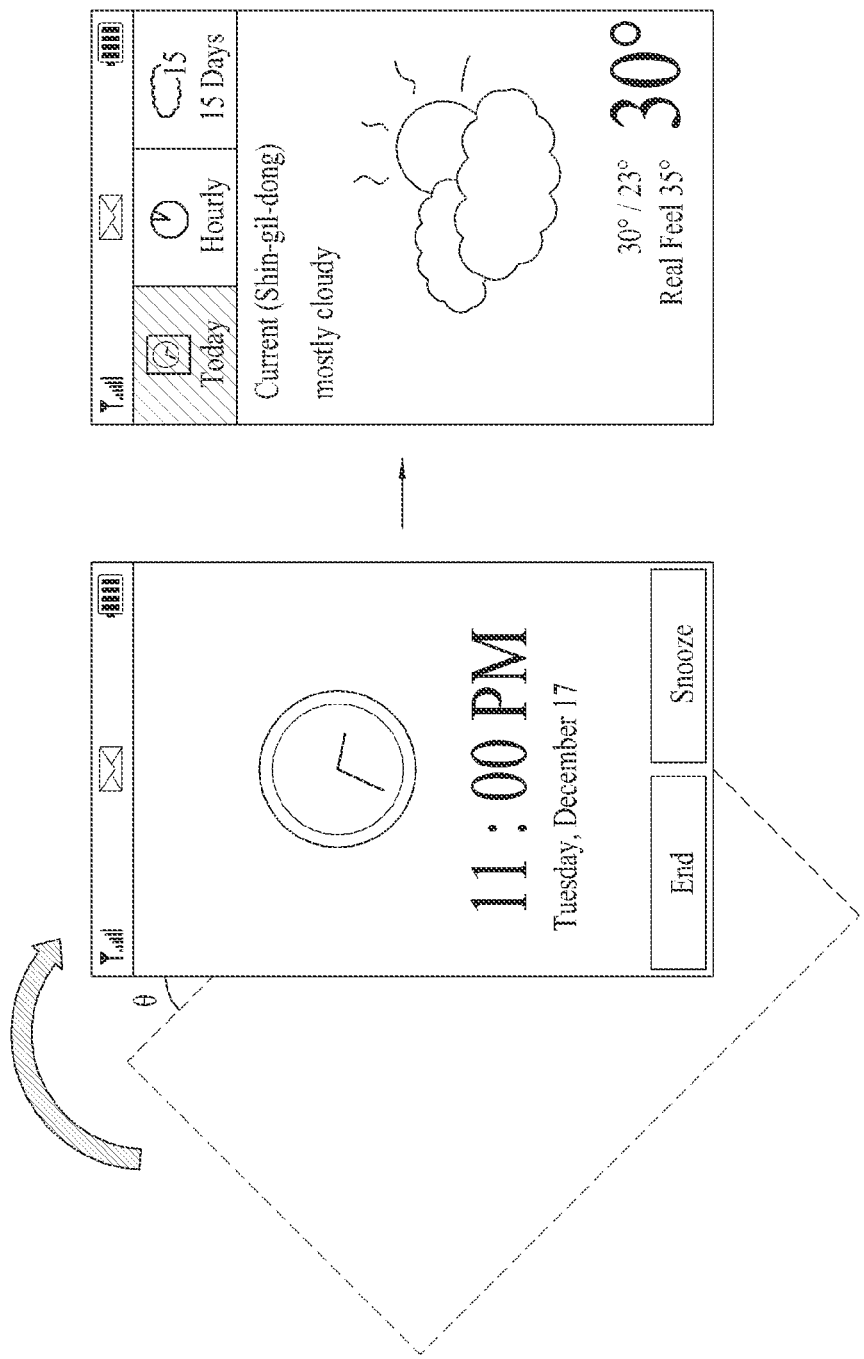

For instance, referring to FIG. 13A and FIG. 13B, a $1^{st}$ user input includes an action of moving the mobile terminal 100 in a $1^{st}$ direction (e.g., an action of rotating the mobile terminal clockwise at an angle equal to or greater than a prescribed angle θ) [FIG. 13A]. And, a $2^{nd}$ user input includes an action of moving the mobile terminal 100 in a $2^{nd}$ direction (e.g., an action of rotating the mobile terminal counterclockwise at an angle equal to or greater than a prescribed angle θ) [FIG. 13B].

While the alarm screen is outputted, if the $1^{st}$ user input is applied, the controller 180 stops outputting the alarm output screen and the alarm and controls a linked application to be executed [FIG. 13A]. On the other hand, while the alarm screen is outputted, if the $2^{nd}$ user input is applied, the controller 180 can stop outputting the alarm output screen and the alarm without executing the linked application [FIG. 13B]. As mentioned in the foregoing description, if the $2^{nd}$ user input is provided to activate a snooze function, the controller 180 stops outputting the alarm output screen and the alarm and controls a snooze period to be counted.

In the example shown in FIG. 13A and FIG. 13B, the motion of the mobile terminal 100 includes a motion of rotating the mobile terminal 100 clockwise or counterclockwise at an angle equal to or greater than a prescribed angle. In addition to the example shown in FIG. 13, each of the $1^{st}$ and $2^{nd}$ user inputs can be applied by taking such a motion as an action of moving the mobile terminal 100 in a prescribed direction by a prescribed distance, an action of flipping the mobile terminal 100 back and forth, and the like.

In the examples shown in FIGS. 8 to 13, each of the $1^{st}$ and $2^{nd}$ user inputs is applied by applying a touch input to an object displayed on an alarm output screen, applying a predefined touch input to an alarm output screen, or taking a prescribed motion of the mobile terminal 100. Yet, the examples shown in FIGS. 8 to 13B are not inextricably intertwined. In particular, it may be unnecessary for the $1^{st}$ user input and the $2^{nd}$ user input to follow the same input mechanism. For instance, it is able to implement the $1^{st}$ user input by taking a prescribed motion of the mobile terminal 100 [FIG. 13A]. And, it is able to implement the $2^{nd}$ user input by applying a touch input to a prescribed object displayed on an alarm output screen [FIG. 8B]. Thus, each of the $1^{st}$ and $2^{nd}$ user inputs can include one of user inputs of various types.

In the examples shown in FIGS. 8 to 13, when an alarm output screen is ended by a $2^{nd}$ user input, a home screen is displayed on the touchscreen 151 for example. Yet, unlike the examples shown in FIGS. 8 to 13, it may be unnecessary to output the home screen in response to a $2^{nd}$ user command. In case that the output of the alarm output screen is ended by the $2^{nd}$ user command, the controller 180 can control a screen, which was outputted to the touchscreen 151 right before the output of the alarm output screen, to be displayed on the touchscreen 151.

Moreover, if the $2^{nd}$ user input is provided to activate a snooze function, it may be unnecessary for both of the alarm output screen and the alarm to be ended in response to the $2^{nd}$ user input. In particular, the alarm output is ended only in response to the $2^{nd}$ user input. Both of the alarm output screen and the alarm output are ended in response to the $2^{nd}$ user input. Thus, the present invention can be implemented in various ways.

In the example shown in FIG. 4, if the $1^{st}$ user input is inputted, the controller 180 can automatically activate the linked application. According to another embodiment of the present invention, the controller 180 determines whether the set linked application is set to be automatically activated. Subsequently, the controller 180 is able to control the linked application to be activated only if the set linked application is set to be automatically activated. If the linked application, which was set when the $1^{st}$ user input was applied, is set to be automatically activated, the controller 180 stops outputting the alarm output screen and the alarm and is then able to control the set linked application to be activated. On the contrary, if the linked application, which was set when the $1^{st}$ user input was applied, is set not to be activated, the controller 180 can stop outputting the alarm output screen and the alarm and without activating the set linked application. A process for adjusting whether to activate a linked application automatically is described in detail with reference to FIG. 14 as follows.

FIG. 14 is a diagram for one example of an alarm output screen for adjusting whether to automatically activate a linked application.

Referring to FIG. 14, the controller 180 can control a toggle key 1410, which is provided to adjust whether to automatically activate a linked application, to be displayed. A user is able to adjust whether to automatically activate a linked application by manipulating the toggle key 1410 displayed on an alarm output screen. In the example shown in FIG. 14 (a), while the toggle key 1410 is set to automatically activate a linked application, if a $1^{st}$ user input is applied (e.g., an end button 1420 is touched to apply the 1st user input), the controller 180 stops outputting the alarm output screen and the alarm and is able to control a set linked application to be activated.

On the contrary, in the example shown in FIG. 14 (b), while the toggle key 1410 is set not to automatically activate a linked application, if a $1^{st}$ user input is applied, the controller 180 can control the alarm output screen and the alarm to stop being outputted without activating a linked application.

In the example shown in FIG. 14, the user may manipulate the toggle key 1410, thereby adjusting whether to automatically activate a linked application after ending the alarm output.

In the following description, in case that a plurality of applications are set as linked applications, an operation of the mobile terminal 100 is described.

<Case of Setting a Plurality of Applications as Linked Applications>

Prior to describing an operation of the mobile terminal 100 in case that a plurality of applications are set as linked applications, it should be noted that the former descriptions with reference to FIGS. 5 to 14 are exactly applicable to the mobile terminal 100 mentioned in the following description.

Figure 15:
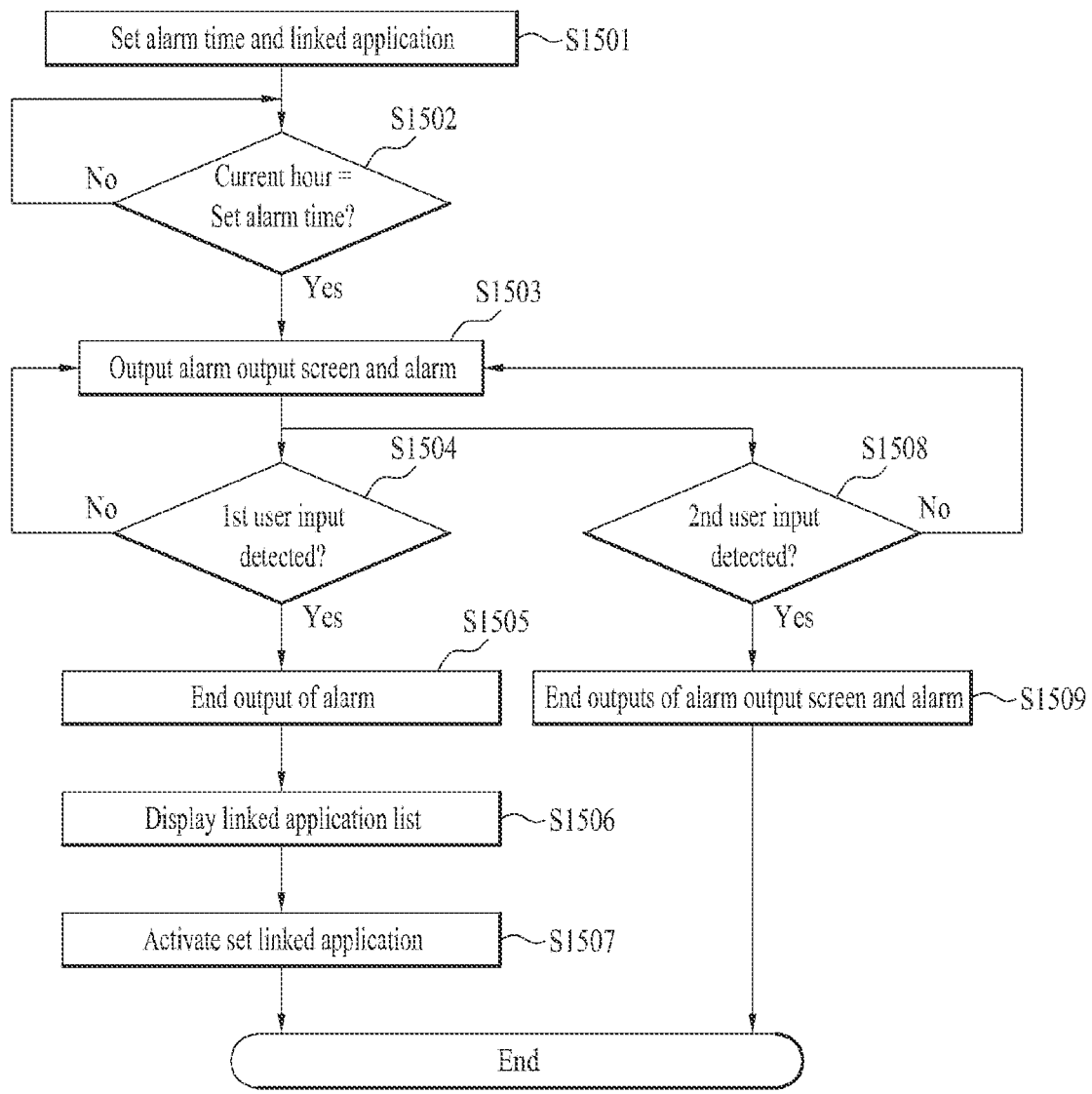
FIG. 15 is a flowchart for an operation of a mobile terminal according to one embodiment of the present invention.

FIG. 15 is a flowchart for an operation of a mobile terminal according to one embodiment of the present invention.

Referring to FIG. 15, the step S1501 of setting an alarm time and a linked application, the step S1502 of comparing a current hour and the set alarm time to each other, and the step S1503 of outputting an alarm correspond to the former steps S401 to S403, respectively. Hence, details of the steps S1501 to S1503 shall be omitted from the following description. As mentioned in the foregoing description with reference to FIG. 5 and FIG. 6, a plurality of applications can be set as linked applications, of which details shall be omitted from the following description.

While the alarm is being outputted, if a $1^{st}$ user input applied to the mobile terminal 100 is detected [S1504], the controller 180 stops outputting the alarm [S1505] and can control a linked application list to be displayed [S1506]. Subsequently, if a user selects at least one application from the linked application list, the controller 180 stops outputting the alarm output screen and controls the selected linked application to be activated [S1507]. Since operations S1508 and S1509 of the mobile terminal 100 in response to a $2^{nd}$ user input are identical to the former operations S407 and S408 described with reference to FIG. 4, their details shall be omitted from the following description.

FIGS. 16 to 19 are diagrams for examples to describe a process for displaying a linked application list in response to a $1^{st}$ user input.

Figure 16:
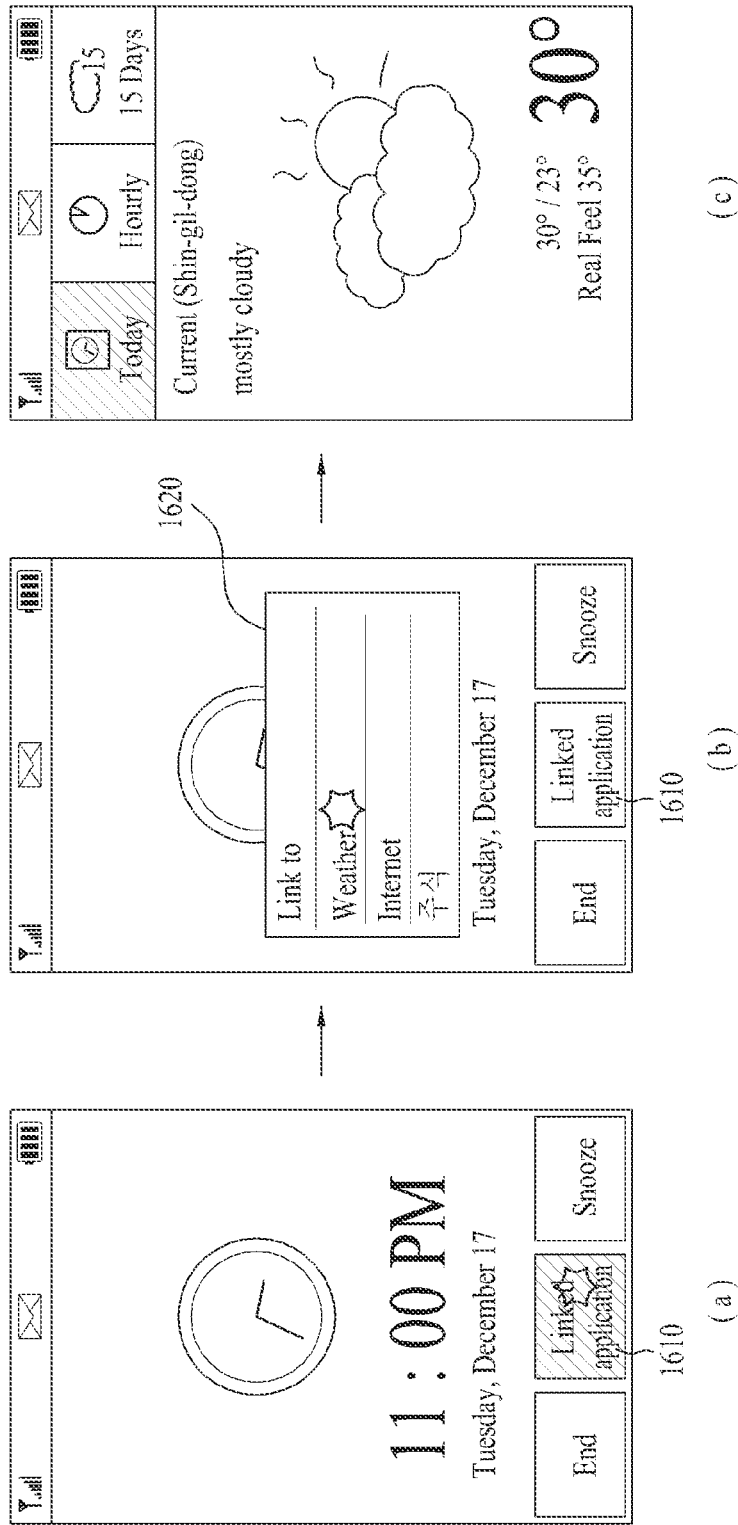

Referring to FIG. 16, the controller 180 can control a popup window 1620, which displays a linked application list, to be displayed in response to a $1^{st}$ user input (e.g., a linked application button 1610 is touched to apply the $1^{st}$ user input). If a user selects a prescribed application from the list displayed on the popup window 1620, the controller 180 can control the selected linked application to be activated.

Figure 17:
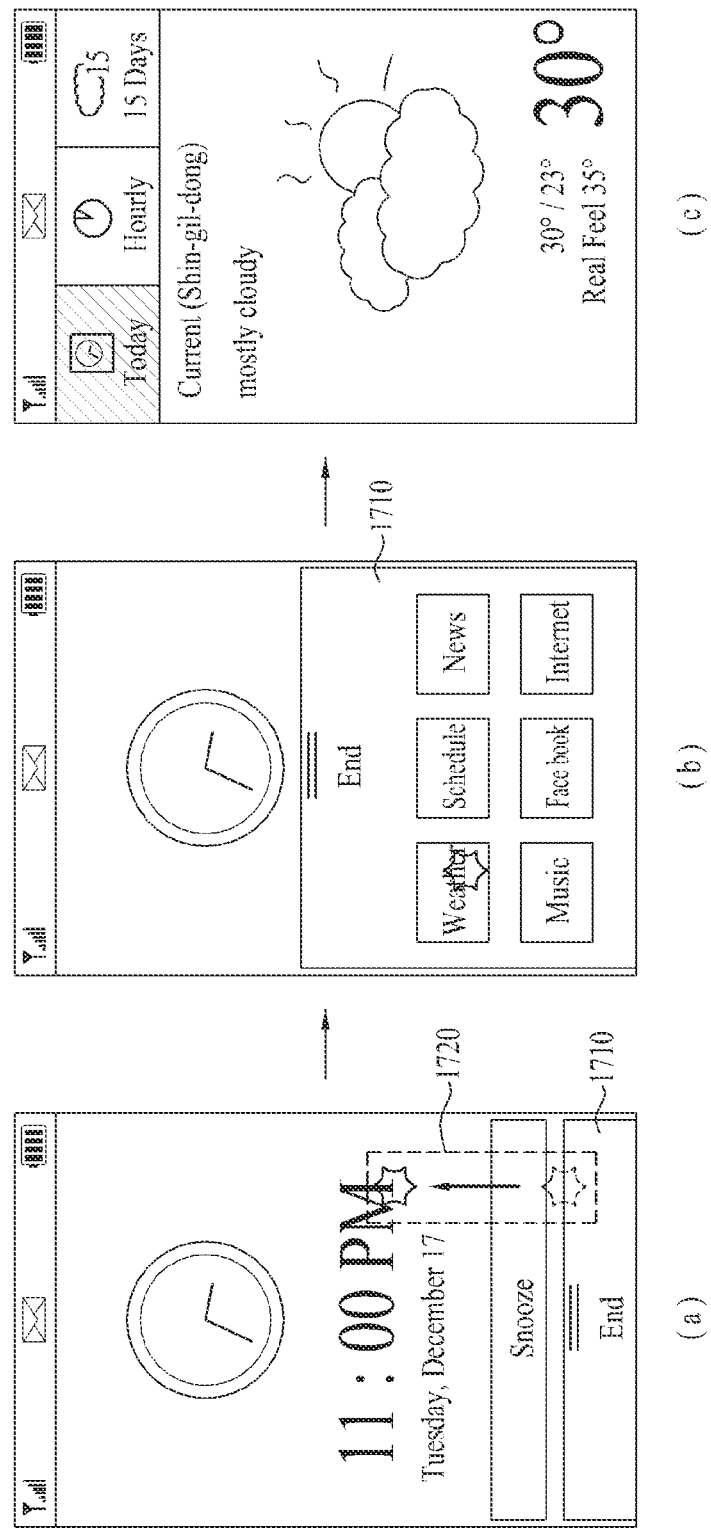

FIG. 17 is a diagram for one example to describe a process for displaying a linked application list within a prescribed object having a $1^{st}$ user input applied thereto.

Referring to FIG. 17, if a $1^{st}$ user input is applied to a prescribed object (e.g., an end button 1710) [i.e., the $1^{st}$ user input is applied in a manner of performing an action 1720 of flicking the end button 1710 in a direction of a top side of the touchscreen 151], the controller 180 extends a display region of the prescribed object and then controls the linked application list to be displayed within the prescribed object. If a prescribed application is selected from the list displayed within the end button (e.g., a weather application is selected), the controller 180 may control the selected linked application to be activated.

Figure 18:
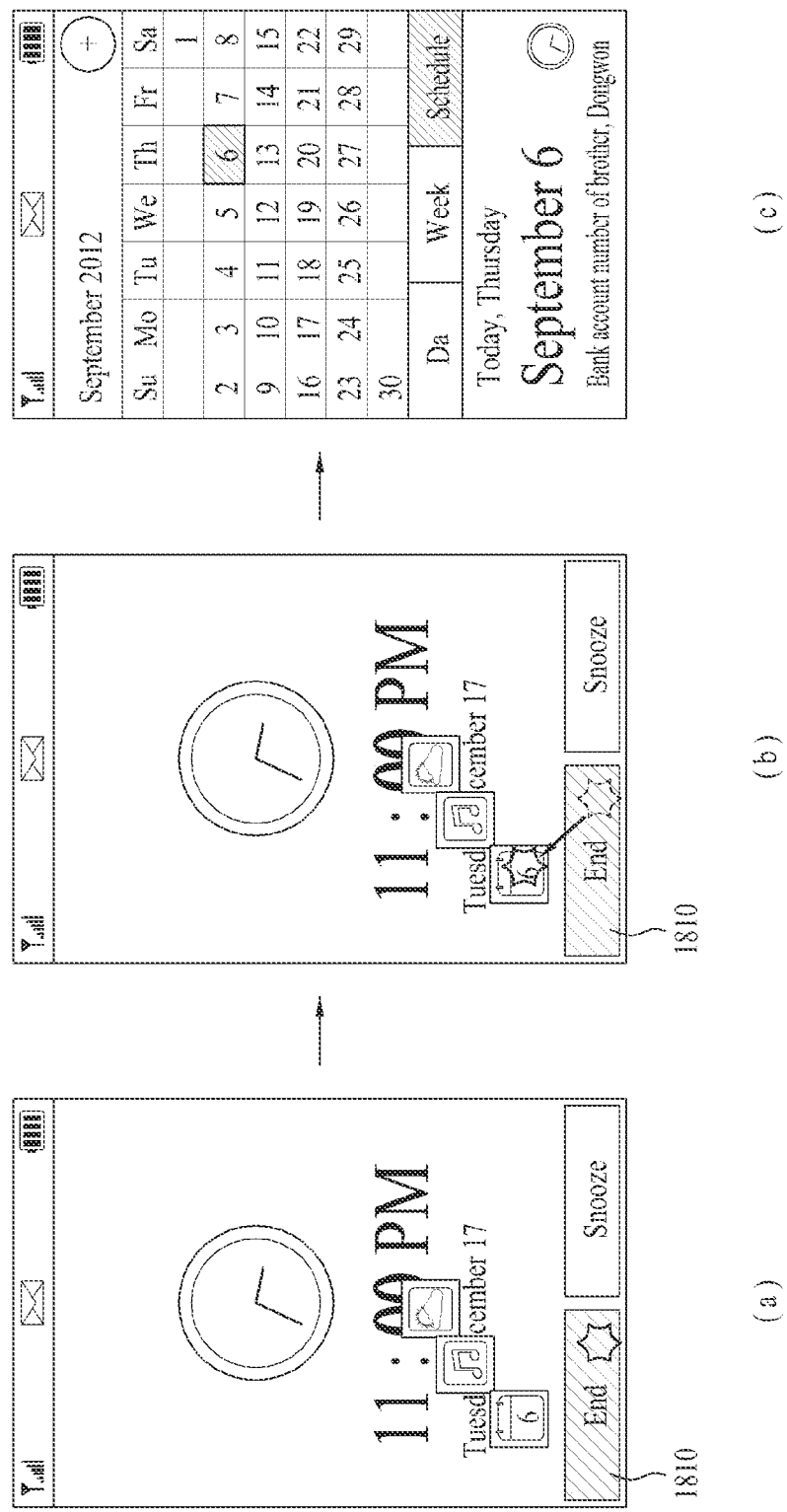

FIG. 18 is a diagram for one example to describe a process for displaying a linked application list around a prescribed object having a $1^{st}$ user input applied thereto.

Referring to FIG. 18, if a $1^{st}$ user input is applied to a prescribed object (e.g., an end button 1810), the controller 180 may control the linked application list to be displayed around the prescribed object. If a prescribed application is selected from the list displayed around the prescribed object, the controller 180 may control the selected linked application to be activated.

In the example shown in FIG. 18, while a contact between a pointer, with which the prescribed object is touched, and the touchscreen 151 is maintained, the controller 180 can control the linked object list to be displayed. Thereafter, if the pointer is released from the contact with the prescribed object, the controller 180 can control the output of the alarm output screen to be ended without activating the linked application. On the other hand, if the pointer is released from a prescribed application on the linked application list, the controller 180 may control a linked application, which corresponds to the contact-released point, to be activated. For instance, in the example shown in FIG. 18, if the pointer is released from the contact with the calendar application, the controller 180 stops outputting the alarm and controls the calendar application to be activated.

Referring to FIG. 19, the controller 180 controls a plurality of applications, which are set as linked applications, to be floated on an alarm output screen, thereby displaying an application list. In particular, the applications are floated so as to be previewed. Thus, 'floating an application' may include an operation of displaying at least one portion of an output screen estimated in case of running the corresponding application actually. In the example shown in FIG. 19, if a user selects at least one of the floated applications, the controller 180 may control the selected at least one application to be activated.

Meanwhile, in FIG. 15, if the $1^{st}$ user input is detected [S1504], the output of the alarm is ended [S1505] and the linked application list is then displayed [S1506]. In doing so, it may be unnecessary for the step S1505 and the step S1506 shown in FIG. 15 to be executed in order of the drawing. Alternatively, both of the step S1505 and the step S1506 may be performed simultaneously. Alternatively, the step S1506 may be followed by the step S1505. For instance, after the step S1506 of displaying the linked application list in response to the $1^{st}$ user input has been performed, if at least one application is selected from the linked application list, the output of the alarm may be ended [S1505].

In the example shown in FIG. 15, the linked application list is displayed in response to the $1^{st}$ user input. According to another embodiment of the present invention, the step S1506 of displaying the linked application list and the step S1507 of displaying the alarm output screen can be performed by being merged with each other.

Figure 20:
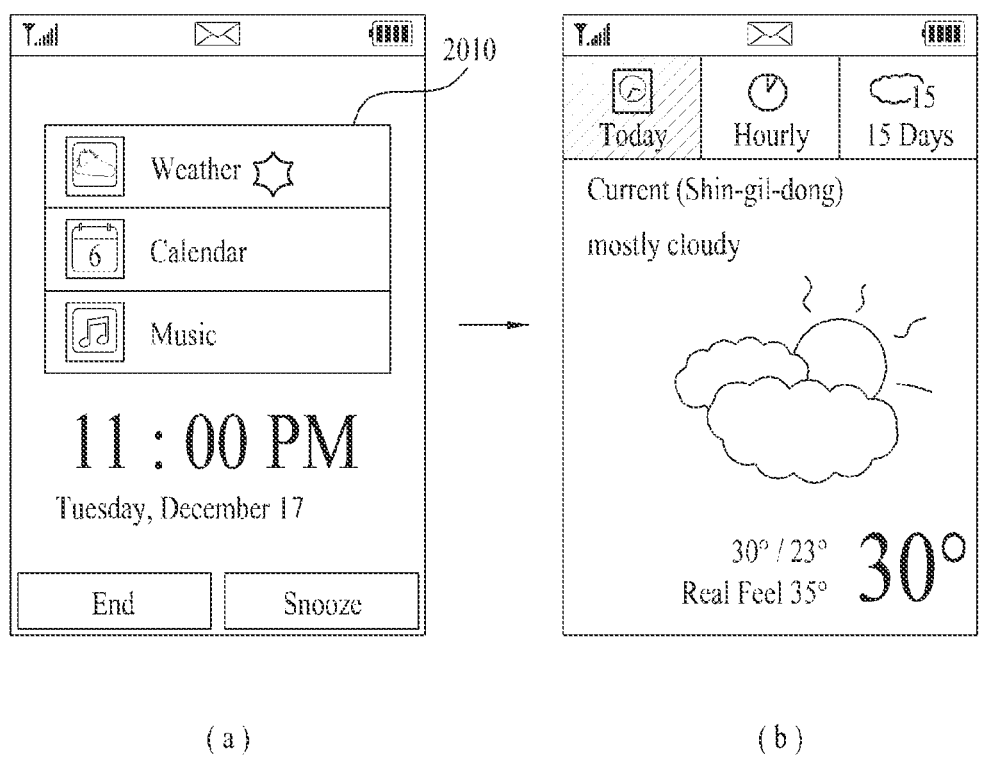
FIG. 20 is a diagram for one example to describe a process for displaying a linked application list on an alarm output screen.

For instance, in case that a current hour is determined as a set alarm time, referring to FIG. 20, the controller 180 can control an alarm output screen including a linked application list 2010 to be displayed while an alarm is being outputted. In doing so, a $1^{st}$ user input may include an action of selecting a prescribed application from the linked application list 2010 displayed on the alarm output screen. In the example shown in FIG. 20, if the $1^{st}$ user input is applied to a prescribed application on the linked display list, the controller 180 stops outputting the alarm output screen and the alarm and may control a linked application (e.g., a weather application) indicated by the $1^{st}$ user input to be activated.

In the example shown in FIG. 15, in case that a plurality of the applications are set as the linked applications, the controller 180 can activate at least one application selected from the linked application list. According to another embodiment of the present invention, the controller 180 can activate a prescribed one of a plurality of the linked applications without displaying the linked application list. This is described in detail with reference to FIG. 21 as follows.

Figure 21:
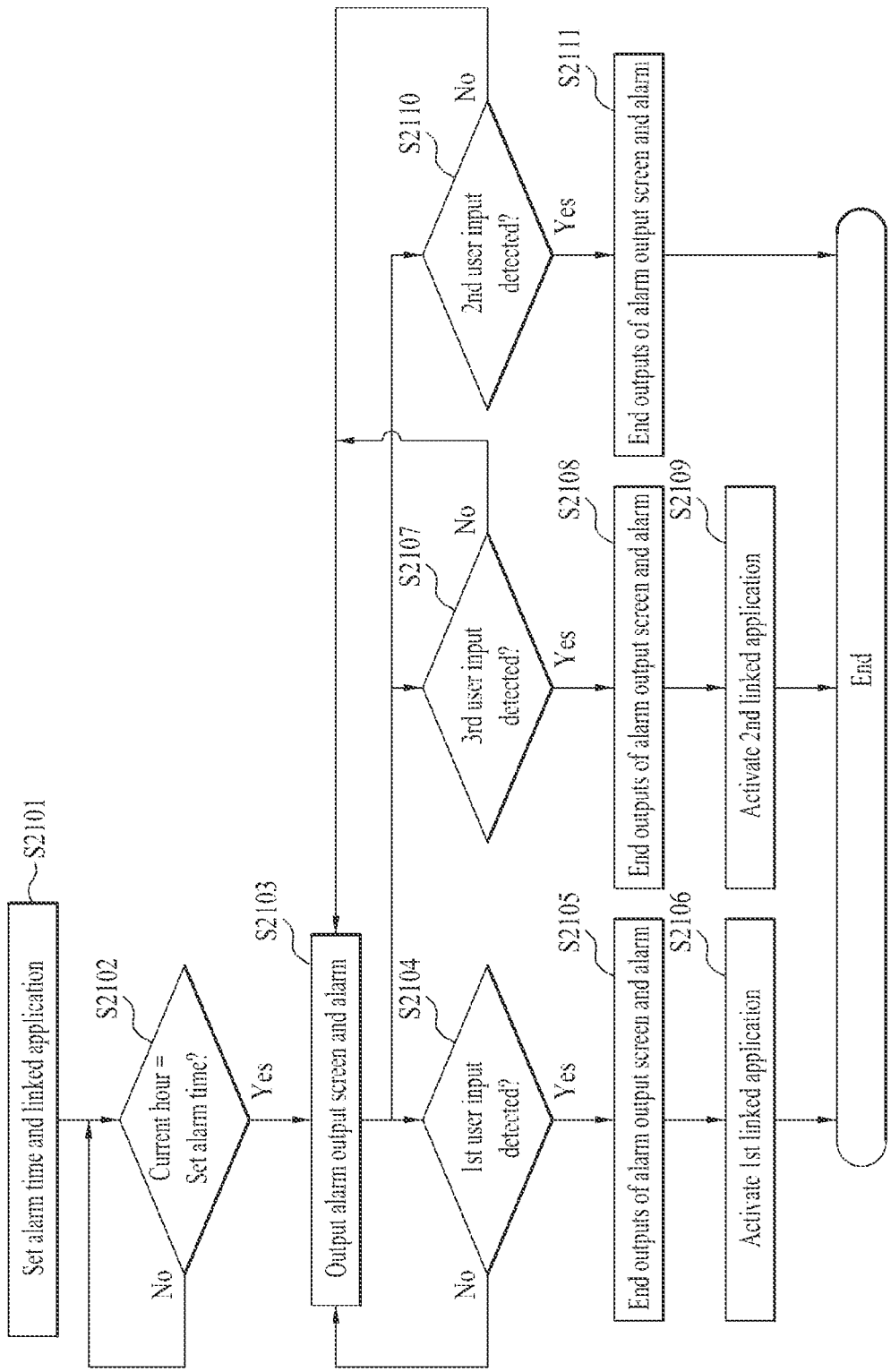
FIG. 21 is a flowchart for an operation of a mobile terminal according to one embodiment of the present invention.

FIG. 21 is a flowchart for an operation of a mobile terminal according to one embodiment of the present invention. The steps S2101, S2102, S2103, S2110 and S2111 shown in FIG. 21 correspond to the former steps S1501, S1502, S1503, S1508 and S1509, respectively, of which details shall be omitted from the following description.

Referring to FIG. 21, in case that a plurality of applications are designated as linked applications, the mobile terminal 100 can determine which one of the linked applications will be activated in response to a user input.

In particular, if a $1^{st}$ user input is applied in the course of outputting an alarm [S2104], the controller 180 stops outputting an alarm output screen and the alarm [S2105] and controls a $1^{st}$ linked application to be activated.

On the other hand, if a $2^{nd}$ user input is applied in the course of outputting an alarm [S2107], the controller 180 stops outputting an alarm output screen and the alarm [S2108] and controls a $2^{nd}$ linked application to be activated.

Figure 22A:
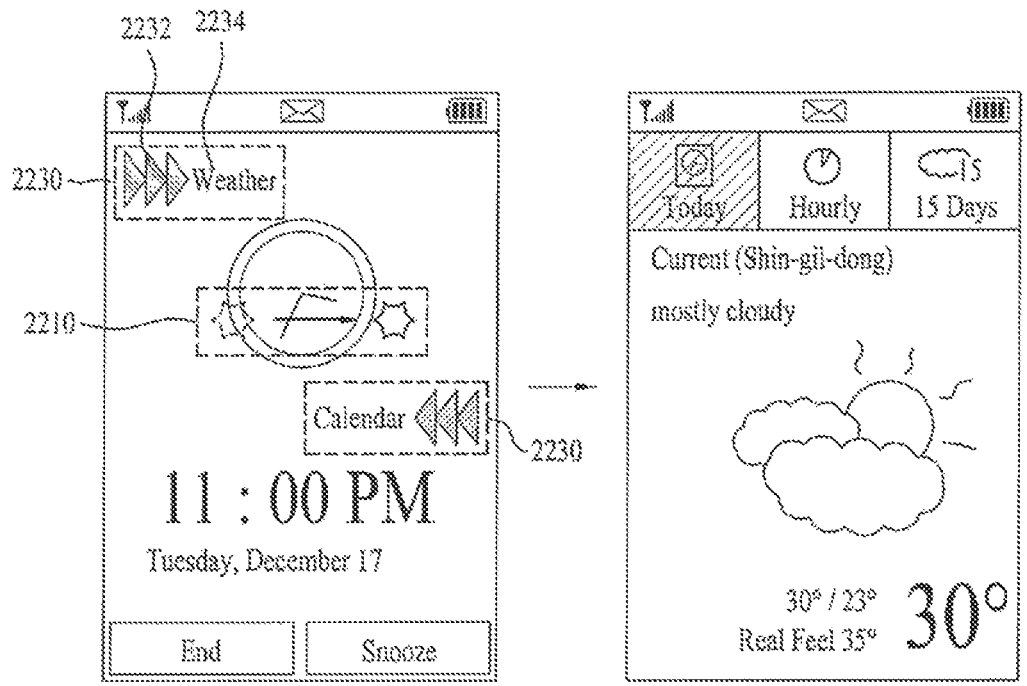
FIG. 22A and FIG. 22B are diagrams for one example to describe a process for determining a linked application activated in response to a user input.
Figure 22B:
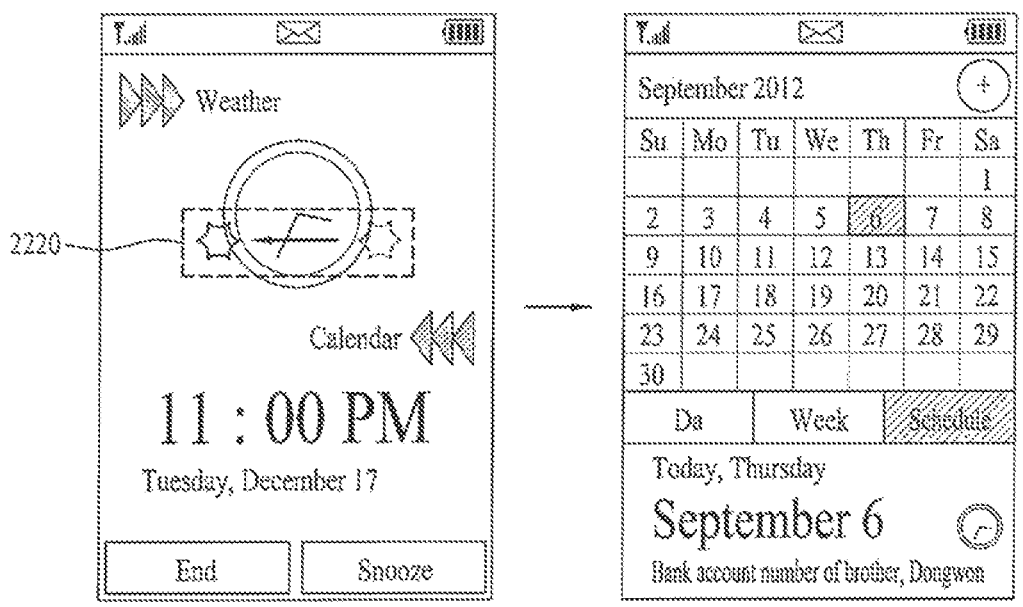

FIG. 22A and FIG. 22B are diagrams for one example to describe a process for determining a linked application activated in response to a user input. FIG. 23A and FIG. 23B are diagrams for another example to describe a process for determining a linked application activated in response to a user input. For clarity, in FIG. 22 and FIG. 23, assume that a $1^{st}$ linked application and a $2^{nd}$ linked application include a weather application and a calendar application, respectively.

In the example shown in FIG. 22A, a flicking input 2210 in a $1^{st}$ direction (e.g., a right direction of the touchscreen 151) is taken as a $1^{st}$ user input. In the example shown in FIG. 22B, a flicking input 2220 in a $2^{nd}$ direction (e.g., a left direction of the touchscreen 151) is taken as a $3^{rd}$ user input.

Referring to FIG. 22A, while an alarm is being outputted, if a $1^{st}$ user input is inputted, the controller 180 can control a $1^{st}$ linked application (i.e., a weather application) to be activated. On the other hand, referring to FIG. 22B, while an alarm is being outputted, if a $3^{rd}$ user input is inputted, the controller 180 can control a $2^{nd}$ linked application (i.e., a calendar application) to be activated.

In order for a user to recognize that different linked applications can be activated in response to different user inputs, respectively, referring to FIG. 22, the controller 180 can control a guide information 2230 to be displayed on an alarm output screen. In the example shown in FIG. 22, the guide information 2230 may include an arrow 2232 configured to guide a $1^{st}$ direction and a $2^{nd}$ direction and a linked application information 2234 on an application active in response to a flicking.

Hence, if a flicking input is applied in the right direction, the user can recognize that the weather application is activated through the guide information displayed on the alarm output screen. If a flicking input is applied in the left direction, the user can recognize that the calendar application is activated through the guide information displayed on the alarm output screen.

FIG. 23A and FIG. 23B are diagrams for one example to describe that a linked application to be activated is determined based on a motion of the mobile terminal 100.

Referring to FIG. 23A and FIG. 23B, a $1^{st}$ user input can be applied by taking a $1^{st}$ motion using the mobile terminal 100. And, a $3^{rd}$ user input can be applied by taking a $3^{rd}$ motion using the mobile terminal 100. In the example shown in FIG. 23A, the $1^{st}$ user input includes an action of rotating the mobile terminal 100 clockwise at an angle equal to or greater than a prescribed angle θ. In the example shown in FIG. 23B, the $3^{rd}$ user input includes an action of rotating the mobile terminal 100 counterclockwise at an angle equal to or greater than a prescribed angle θ. If the $1^{st}$ user input is applied while an alarm is being outputted, referring to FIG. 23A, the controller 180 can control a $1^{st}$ linked application (i.e., a weather application) to be activated. On the other hand, referring to FIG. 23B, while an alarm is being outputted, if the $3^{rd}$ user input is inputted, the controller 180 can control a $2^{nd}$ linked application (i.e., a calendar application) to be activated.

In the examples shown in FIGS. 21 to 23, the operations of the mobile terminal 100 are described on the assumption that two applications are set as the linked applications. Assuming that at least 3 applications are set as the linked applications by extending the embodiments or examples shown in FIGS. 21 to 23, various linked applications can be activated in response to various user inputs including a user input for activating a $3^{rd}$ linked application through a $4^{th}$ user input.

In the examples shown in FIG. 15 and FIG. 23, if a prescribed linked application is selected from a linked application list in the course of outputting an alarm or a linked application to be activated is designated by a user input, the selected or designated linked application can be activated. According to another embodiment of the present invention, in case that a plurality of applications are designated as linked applications, the controller 180 can control a $1^{st}$ linked application having a top priority to be preferentially activated based on a $1^{st}$ user input. This operation is described in detail with reference to FIG. 24 as follows.

Figure 24:
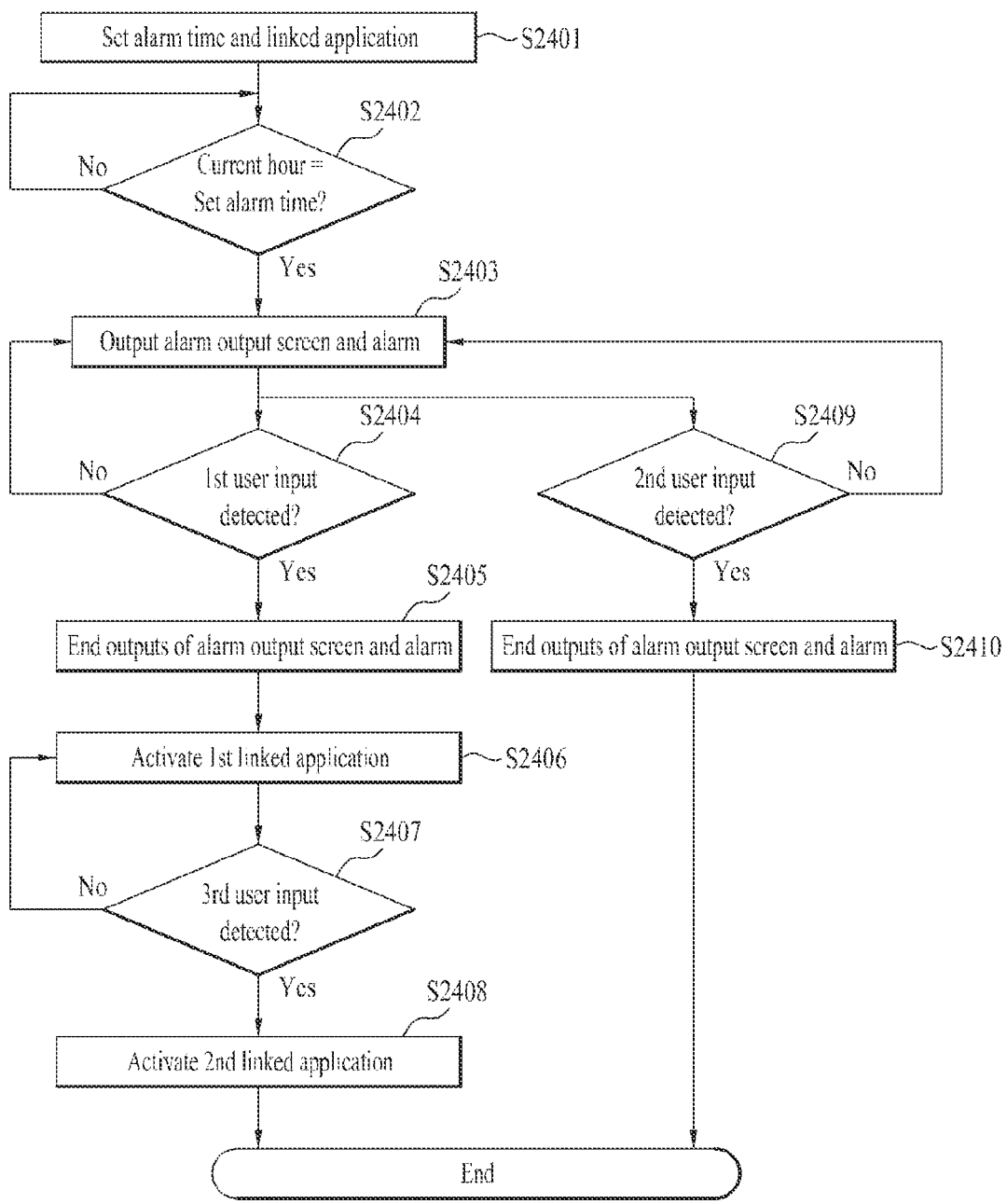
FIG. 24 is a flowchart for an operation of a mobile terminal according to one embodiment of the present invention.

FIG. 24 is a flowchart for an operation of a mobile terminal according to one embodiment of the present invention.

Referring to FIG. 24, in the step S2401 of setting an alarm time and a linked application, in case that a plurality of applications are set as linked applications, the controller 180 can control priorities to be determined among a plurality of the linked applications.

Figure 25:
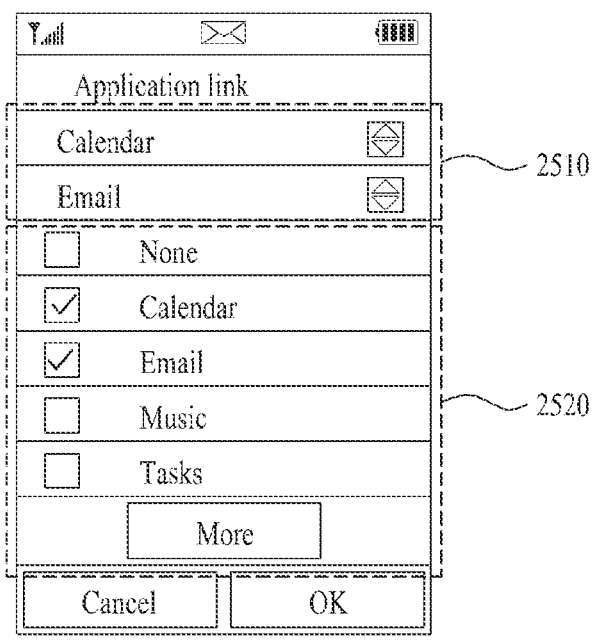
FIG. 25 is a diagram for one example of a screen provided to a user to adjust priorities among a plurality of linked applications.

For instance, FIG. 25 is a diagram for one example of a screen provided to a user to adjust priorities among a plurality of linked applications.

Referring to FIG. 25, a set linked application list is displayed on a $1^{st}$ region 2510 and an application candidate list of application candidates settable as linked applications is displayed on a $2^{nd}$ region 2520.

A user can determine a priority of a prescribed linked application by adjusting a position of the linked application list displayed on the $1^{st}$ region 2510. Assuming that a priority of a linked application located at an upper part of the $1^{st}$ region 2510 gets higher, it can be observed from FIG. 25 that a weather application and a calendar application can be determined as a linked application of a $1^{st}$ priority and a linked application of a $2^{nd}$ priority, respectively.

Since the steps S2402, S2403, S2409 and S2410 shown I FIG. 24 correspond to the steps S1502, S1503, S1508 and S1509, respectively, their details shall be omitted from the following description for clarity.

While an alarm is being outputted, if a $1^{st}$ user input applied to the mobile terminal 100 is detected [S2404], the controller stops outputting the alarm output screen and the alarm [S2405] and can control a $1^{st}$ linked application of a highest priority to be activated among a plurality of the linked applications [S2406]. While the $1^{st}$ linked application is active, if a $3^{rd}$ user input is detected [S2407], the controller can control a $2^{nd}$ linked application, which has a priority right next to that of the $1^{st}$ linked application, to be activated [S2408].

Figure 26:
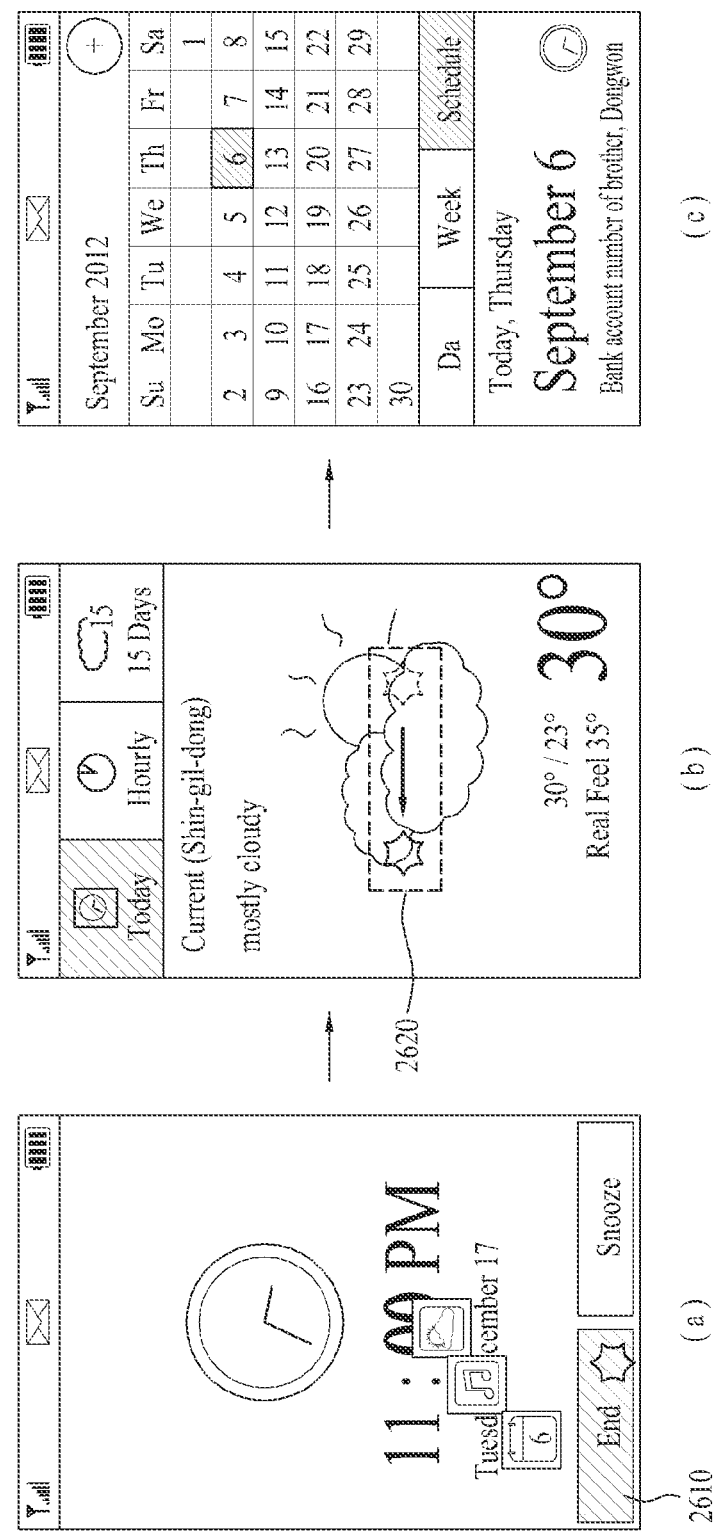
FIG. 26 is a diagram for one example to describe a process for activating a $1^{st}$ linked application of a top priority and a $2^{nd}$ linked application of a priority next to the top priority after ending an output of an alarm.

FIG. 26 is a diagram for one example to describe a process for activating a $1^{st}$ linked application of a top priority and a $2^{nd}$ linked application of a priority next to the top priority after ending an output of an alarm. For clarity, assume that the $1^{st}$ linked application set to the top priority and the $2^{nd}$ linked application set to a priority next to that of the $1^{st}$ linked application include a weather application and a calendar application, respectively.

Referring to FIG. 26, while an alarm is being outputted, if a $1^{st}$ user input is applied (e.g., an end button 2610 is touched) [FIG. 26 (a)], the controller 180 can control the $1^{st}$ linked application (i.e., the weather application) to be activated [FIG. 26 (b)].

While the $1^{st}$ linked application is active, if a $3^{rd}$ user input 2620 is applied (e.g., a pointer is flicked in a direction from right to left on the touchscreen 151) [FIG. 26 (b)], the controller 180 ends the $1^{st}$ linked application and then controls the $2^{nd}$ linked application to be activated [FIG. 26 (c)]. In particular, in the example shown in FIG. 26, the mobile terminal 100 according to the present invention can control the linked applications to be sequentially activated in accordance with the user-set priorities, respectively.

In the above-described embodiments, even if a plurality of the linked applications are set, the mobile terminal 100 can selectively activate one of the linked applications only. According to another embodiment of the present invention, if a $1^{st}$ user input is applied, the mobile terminal 100 can activate a plurality of linked applications simultaneously. For instance, in case that two applications are set as the linked applications, the controller 180 can activate both the $1^{st}$ linked application and the $2^{nd}$ linked application simultaneously in response to a $1^{st}$ user input. For example, referring to FIG. 27, if a $1^{st}$ user input is applied (e.g., an end button 2710 is touched to apply the $1^{st}$ user input), the controller 180 can control a $1^{st}$ linked application and a $2^{nd}$ linked application to be outputted to a $1^{st}$ region 2720 and a $2^{nd}$ region 2730 of the touchscreen 151, respectively.

In the example of the above-described embodiment, only if the $1^{st}$ user input is applied in the course of outputting the alarm, the linked application can be activated. According to another embodiment of the present invention, if a current hour is determined as a set alarm time, the mobile terminal 100 may be set to activate a linked application despite that a $1^{st}$ user input is not applied yet. For instance, the linked application activating step S406 may be performed after performing the step S402, simultaneously with the step S403, or prior to the step S403. In doing so, referring to FIG. 28, the controller 180 may output an alarm output screen overlaid on an active screen of the linked application. While the alarm output screen is being outputted in a manner of being overlaid on the active screen of the linked application, if a $1^{st}$ user input is applied (e.g., an end button 2810 is touched to apply the $1^{st}$ user input) [FIG. 28], the controller 180 ends the outputs of the alarm output screen and the alarm and may control the active screen of the linked application to be exactly displayed.

According to one embodiment of the present invention, the controller 180 can control an unidentified event occurrence information of a user to be displayed on an alarm output screen. In this case, the unidentified event may indicate the event in which a user has not checked a reception history despite receiving new data externally. And, the unidentified event may include a reception of at least one of a new email, a new text message, a new instant message, a new incoming call in absence, and the like.

The controller 180 enables a user to conveniently check a presence or non-presence of an unidentified event in a manner of displaying an unidentified event count (particularly, at least one of the number and titles of new email receptions, the number of new text message receptions, the number of new instant message receptions, and the number of new absent incoming call receptions) and/or an unidentified event content (particularly, at least one of a title of a new email, a content of a new text message, a content of a new instant message, and a sender information of a new absent incoming call) on the unidentified event occurrence information.

Figure 29:
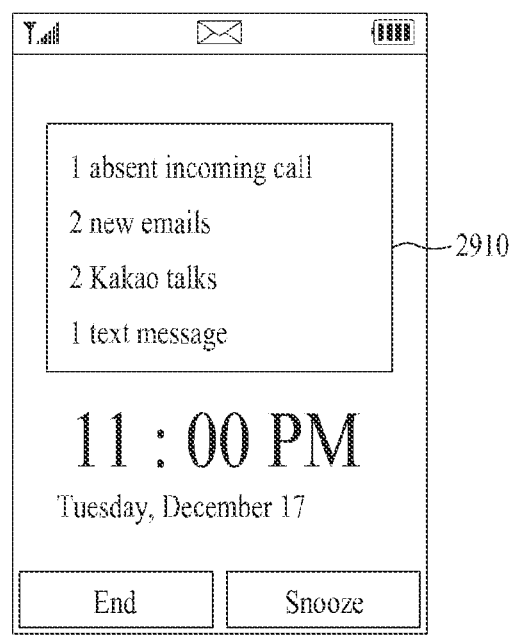
FIG. 29 is a diagram for one example of a process for displaying an unidentified event occurrence information on a touchscreen.

FIG. 29 is a diagram for one example of a process for displaying an unidentified event occurrence information on a touchscreen.

Referring to FIG. 29, the controller 180 can output an unidentified event occurrence information 2910 on an event, which is not checked yet by a user, to an alarm output screen. The user checks the unidentified event occurrence information displayed on the alarm output screen, thereby recognizing or obtaining a list of unidentified events conveniently and easily.

In the examples shown in FIG. 4, FIG. 15, FIG. 21 and FIG. 26, the mobile terminal 100 can automatically activate a prescribed linked application in response to a $1^{st}$ user input (or a $3^{rd}$ user input). The mobile terminal 100 according to the present invention generates a control signal for controlling an operation of an external device in response to a $1^{st}$ user input (or a $3^{rd}$ user input) and is able to further perform a step of transmitting the generated control signal to the external device via the wireless communication unit 110. In this case, the control signal is generated to adjust an operation of the external device and may be provided to set a power state of the external terminal to 'On' state.

FIG. 30A and FIG. 30B are diagrams to describe an interoperation between a mobile terminal and an external device.

For instance, in case that an external device includes a TV, the controller 180 transmits a control signal for turning on a power of the TV to the TV in response to a $1^{st}$ user input (e.g., an end button 3010 is touched to apply the $1^{st}$ user input in FIG. 30A), thereby controlling the power of the TV to be turned on.

Subsequently, the controller 180 can further perform a step of providing a real-time output screen of the touchscreen 151 to an external device to mirror an output screen of the mobile terminal 100 on the external device.

For instance, referring to FIG. 30B, if a power of a TV is turned on, the controller 180 provides a real-time output image of the touchscreen 151 to the TV, thereby controlling an output image of the mobile terminal 100 to be mirrored on the TV. In doing so, referring to FIG. 30B, the external terminal can display the mirrored image of the mobile terminal 100 as a PIP 3020 (picture in picture).

The step of generating the control signal for adjusting the operation of the external device, the step of transmitting the control signal to the external device, and the step of providing the real-time output screen of the touchscreen 151 to the external device can be performed in parallel with the alarm output ending step and the linked application activating step in response to the $1^{st}$ user input (and the $3^{rd}$ user input) described with reference to FIG. 4, FIG. 15, FIG. 21 and FIG. 26.

In doing so, in order to transmit the control signal to the external device, the mobile terminal 100 and the external device are connected to the same channel (or network) or a network address (e.g., an IP address) of the external device should be saved in the memory 160 in advance. Hence, before a current hour becomes a set alarm time, a process for connecting the mobile terminal 100 to the same channel (or network) of the external device or a process for saving the network address of the external device may be performed in advance.

Although the external device includes the TV for example in FIG. 30, it may be unnecessary for the external device to be limited to the TV. For instance, the external device may include one of various electronic devices including a computer, a notebook computer, an audio component, an illumination device and the like.

As mentioned in the foregoing descriptions of the examples, the $2^{nd}$ user input shown in FIG. 4, FIG. 15, FIG. 21 or FIG. 26 may be provided to activate a snooze function. If the $2^{nd}$ user input is provided to activate the snooze function, the controller 180 may control a snooze period to be counted in order to re-output an alarm output screen and an alarm in response to the $2^{nd}$ user input.

Yet, the step of detecting the $2^{nd}$ user input shown in FIG. 4, FIG. 15, FIG. 21 or FIG. 26 and the step of ending the alarm output screen and the alarm in response to the $2^{nd}$ user input may not be necessary for the present invention. Hence, it is able to implement the present invention by skipping the step of detecting the $2^{nd}$ user input shown in FIG. 4, FIG. 15, FIG. 21 or FIG. 26 and the step of ending the alarm output screen and the alarm in response to the $2^{nd}$ user input.

Accordingly, embodiments of the present invention provide various effects and/or features.

First of all, the present invention can provide a mobile terminal, thereby enhancing user's convenience.

Secondly, if an output of an alarm is ended, the present invention automatically activates a linked application, thereby enabling a user to check a desired information conveniently and easily.

Thirdly, if an output of an alarm is ended, the present invention automatically turns on a power of an external device, thereby enabling a user to use the external device conveniently and easily.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a display unit;
a memory; and
a controller configured to:
cause the display unit to display, prior to a set alarm time, the set alarm time and information about a plurality of applications linked to the set alarm time, wherein the set alarm time is stored in the memory;
cause outputting of an alarm at the set alarm time;
cause the display unit to display unidentified event occurrence during the outputting of the alarm;
cause the display unit to display a linked application list in response to a first user input received during the outputting of the alarm; and
end the outputting of the alarm and activate a first linked application selected from the linked application list in response to releasing of the first user input, wherein the first user input is released from displayed information corresponding to the first linked application and included in the linked application list.

2. The mobile terminal of claim 1, wherein the controller is further configured to end the outputting of the alarm without activating the first linked application when a second user input, instead of the first user input, is received during the outputting of the alarm.

3. The mobile terminal of claim 2, wherein the controller is further configured to:
start a snooze period in response to the second user input; and
cause outputting of the alarm when the snooze period expires.

4. The mobile terminal of claim 1, wherein the first user input is received at a first position on a touchscreen of the display unit and released from a second position on the touchscreen on which the information corresponding to the first linked application is displayed.

5. The mobile terminal of claim 4, wherein the first user input is moved from the first position to the second position prior to the releasing of the first user input from the second position.

6. The mobile terminal of claim 1, wherein the controller is further configured to end the outputting of the alarm and automatically activate a second linked application selected from the linked application list in response to a second user input received during the outputting of the alarm.

7. The mobile terminal of claim 6, wherein:
the first user input is applied in a manner of moving a first object displayed on the display unit in a first direction; and
the second user input is applied in a manner of moving the first object in a second direction that is different from the first direction.

8. The mobile terminal of claim 7, wherein the controller is further configured to cause the display unit to display guide information for guiding the first direction and the second direction during the outputting of the alarm.

9. The mobile terminal of claim 1, wherein the controller is further configured to activate a second linked application included in the linked application list in response to a second user input received after the activation of the first linked application.

10. The mobile terminal of claim 9, wherein a priority of the first linked application is higher than a priority of the second linked application.

11. The mobile terminal of claim 1, wherein the unidentified event occurrence information comprises at least one selected from the group consisting of a number of new email receptions, a number of new text message receptions, a number of new instant message receptions, and a number of new incoming call receptions.

12. The mobile terminal of claim 1, wherein the controller is further configured to activate the first linked application and a second linked application included in the linked application list simultaneously in response to the first user input.

13. The mobile terminal of claim 12, wherein the controller is further configured to cause the display unit to:
display the first linked application at a first region of the display unit; and
display the second linked application at a second region of the display unit.

14. The mobile terminal of claim 1, further comprising a wireless communication unit, wherein the controller is further configured to communicate with an external device via the wireless communication unit and cause the external device to be turned on in response to the first user input.

15. The mobile terminal of claim 14, wherein the controller is further configured cause mirroring of an output screen of the display unit at the external device when the external device is turned on.

16. The mobile terminal of claim 1, wherein the controller is further configured to set applications, of which corresponding activate icons are located in a same folder in which an activate icon of an alarm application is located, as the plurality of applications linked to the set alarm time.

17. A method for controlling a mobile terminal, comprising:
- setting an alarm time;
- displaying, prior to the set alarm time, the set alarm time and information about a plurality of applications linked to the set alarm time, wherein the set alarm time is stored in a memory;
- outputting an alarm at the set alarm time;
- displaying unidentified event occurrence during the outputting of the alarm;
- displaying a linked application list in response to a first user input received during the outputting of the alarm; and
- ending the outputting of the alarm and activating a first linked application selected from the linked application list in response to releasing of the first user input, wherein the first user input is released from displayed information corresponding to the first linked application and included in the linked application list.

* * * * *